United States Patent [19]

Ooka et al.

[11] Patent Number: 6,084,586

[45] Date of Patent: Jul. 4, 2000

[54] METHOD AND APPARATUS FOR FORMING OBJECTS BASED ON FREE-FORM CURVES AND FREE-FORM SURFACES GENERATED BY MINIMIZING SUM OF DISTANCES FROM AN INPUT SERIES OF POINTS TO A FREE-FORM CURVE

[75] Inventors: Miwa Ooka; Tetsuzo Kuragano, both of Tokyo, Japan

[73] Assignee: Sony Corporation, Tokyo, Japan

[21] Appl. No.: 07/965,079

[22] Filed: Oct. 22, 1992

[30] Foreign Application Priority Data

Oct. 29, 1991 [JP] Japan ................................. 3-311952

[51] Int. Cl.$^7$ ................................................. G06T 17/20
[52] U.S. Cl. ................................................................. 345/419
[58] Field of Search ........................... 395/119, 141, 395/142, 137; 345/419, 441, 442, 437

[56] References Cited

U.S. PATENT DOCUMENTS

| | | | |
|---|---|---|---|
| 4,866,631 | 9/1989 | Kuragano et al. | 364/474.29 |
| 4,890,242 | 12/1989 | Sinha et al. | 345/419 |
| 5,014,230 | 5/1991 | Sinha et al. | 364/578 |
| 5,065,348 | 11/1991 | Kuragano et al. | 345/442 X |
| 5,121,333 | 6/1992 | Riley et al. | 345/437 X |
| 5,121,334 | 6/1992 | Riley et al. | 345/49 X |
| 5,231,697 | 7/1993 | Yamada | 345/442 |
| 5,237,649 | 8/1993 | Yamada | 345/442 |
| 5,253,336 | 10/1993 | Yamada | 345/442 |
| 5,351,196 | 9/1994 | Sowar et al. | 364/474.24 |
| 5,353,389 | 10/1994 | Fiasconaro | 345/419 |
| 5,369,736 | 11/1994 | Kato et al. | 345/425 |

OTHER PUBLICATIONS

Orchard–Hays, Advanced Linear Programming Computing Techniques, 1968 p. 1 to 62.
Foley et al, Computer Graphics: Principles and Practice, 1990, p 1094 to 1103.
Foley et al, Computer Graphics: Principles and Practice, 1990, p. 216–253, 471–529, 740–745.

*Primary Examiner*—Anton Fetting
*Attorney, Agent, or Firm*—Frommer Lawrence & Haug, LLP.; William S. Frommer

[57] ABSTRACT

A method and apparatus is presented in which a physical object is formed on the basis of data that represents a free-form surface. A free-form surface is formed by entering into a designing device a series of input points. A free-form surface forming unit of the designing device then generates geometric data that represents an object to be formed. The free-form surface forming unit uses this geometric data to control a milling machine, which sculpts an object in accordance with the geometric data.

5 Claims, 15 Drawing Sheets

EQUILUMINOUS LINE

METHOD AND APPARATUS FOR FORMING OBJECTS BASED ON FREE-FORM CURVES AND FREE-FORM SURFACES GENERATED BY MINIMIZING SUM OF DISTANCES FROM AN INPUT SERIES OF POINTS TO A FREE-FORM CURVE

BACKGROUND OF THE INVENTION

This invention relates to a method of forming free-form curves and method of forming free-form surfaces, and more particularly is applicable to a designing device using the technique of CAD/CAM (computer aided design/computer aided manufacturing) for example.

In the case where the technique of CAD is used to design the shape of an object having free-form surface (geometric modeling), the designer usually designates a plurality of points (referred to as nodal points) in a three-dimensional space which are passed through by the curved surface. A surface represented by a so-called wire-frame is formed by causing a desired vector function to calculate a boundary curve network which connects the designated nodal points. Thereby, a number of framing spaces surrounded by the boundary curves may be formed (such processing is referred to as framing process).

The boundary curve network formed such framing process by itself represents a generalized shape of a design intended by the designer. A free-form surface (referring to one which cannot be defined by a quadratic function) designed as a whole by the designer may be generated, if it is possible by interpolation to obtain a curved surface which may be represented by a predetermined vector function using the boundary curves surrounding the respective framing spaces. Here, the curved surface pasted on each framing space forms a fundamental element for constructing the total curved surface, and it is referred to as a patch.

In order to give a more natural appearance of the shape to the generated free-form surface as a whole, a method of forming a free-form curve (Japanese Patent Application No.60-277448) has been proposed, in which, for two framing spaces adjoining each other with an interposing common boundary, the control side vectors around the common boundary is redetermined so as to paste a patch which satisfies the condition of continuity of tangential planes at the common boundary.

As shown in FIG. 1, the principle of such free-form surface forming method is that: patch vector S(u,v)1 and patch vector S(u,v)2 to be pasted onto quadrilateral framing spaces are represented by a vector function S(u,v) consisting of a third order Bezier expression; in order to smoothly connect the two patch vectors S(u,v)1 and vector S(u,v)2, control side vectors, vector a1, vector a2 and vector c1, vector c2 are determined so that the condition of continuity of tangential planes is satisfied at the common boundary COM of the adjoining patch vectors S(u,v)1 and S(u,v)2 on the basis of the nodal points, vector P(00), vector P(30)1, vector P(33)1, vector P(03), vector P(33)2 and vector P(30)2, which are given by the framing process; and the control point vectors, vector P(11)1, vector P(12)1, vector P(11)2 and vector P(12)2, are redetermined by these control side vectors.

As a result of applying such technique also to other common boundaries, the patch vectors, vector S(u,v)1 and vector S(u,v)2, may be smoothly connected to adjoining patches in accordance with the condition of continuity of tangential planes.

Here, the vector function vector S(u,v) formed of a third order Bezier expression is represented using parameters u and v in the u direction and the v direction and shift operation E and F by the following formula:

$$S(u,v)=(1-u+uE)^3(1-v+vF)^3 P(00) \quad (1)$$

and is related to the control point vectors P(ij) as follows:

$$E \cdot P(ij)=P(i+1,j) \quad (i,j=0,1,2) \quad (2)$$

$$F \cdot P(ij)=P(i,j+1) \quad (i,j=0,1,2) \quad (3)$$

$$0 \leq u \leq 1 \quad (4)$$

$$0 \leq v \leq 1 \quad (5)$$

Further, a tangential plane refers to the plane formed by the tangential vectors in the u direction and the v direction at each point on the common boundary. For example, the condition of continuity of tangential planes is satisfied with respect to the common boundary COM12 of FIG. 1 when the tangential planes of the patch vectors, vector S(u,v)1 and vector S(u,v)2, are identical to each other.

According to this method, designing is readily possible of the shape of an object such as one with a surface geometry changing smoothly as a whole exactly as intended by the designer, which has been practically difficult to be designed by a conventional designing method.

With such a designing device, it is presumed that the operability of the designing device may be improved and it is convenient if the contour of the object to be designed may be inputted as a series of points.

To this end, it is necessary to form a wire-frame model in a manner of connecting the input series of points.

Further, the free-form curves forming the wire-frame model must be represented by Bezier curves.

Furthermore, the free-form surface must be generated with respect to the generated wire-frame model so that it passes through a group of points.

In addition, it is presumably convenient if the geometric shape of thus generated patch is corrected using a curved surface such as of circular arc.

If a change in the shape of a curved surface is possible in this manner, the size of a patch may be set over again as required and it is also possible to set the framing space itself over again.

SUMMARY OF THE INVENTION

In view of the foregoing, an object of this invention is to provide a free-form curve forming method and a free-form surface forming method for generating a Bezier curve and a Bezier curved surface on the basis of given series of points, group of points and curved surfaces.

To achieve such objects, in a first aspect of the present invention, in a curve forming method where control points (vector P1 and vector P2) are formed between two nodal points (vector P0 and vector P3) on a three-dimensional space to generate a free-form curve represented by a vector function (vector R(t)) using a predetermined parameter t on the basis of the nodal points (vector P0, vector P3) and the control points (vector P1 and vector P2): start point (vector q1) and end point (vector qm) of an input series of points (vector q1 to vector qm) are set respectively as nodal points (vector P0 and vector P3); control points (vector P1 and vector P2) are temporarily set on the basis of points (vector q2 and vector qm−1) of the series of points (vectors q1 to vector qm) which respectively adjoin the start point (vector q1) and the end point (vector qm); perpendiculars are then drawn from each of the points (vector q2 to vector qm−1) of the input point series (vector q1 to vector qm) to a free-form curve (vector R(t)) which is determined by the nodal points (vector P0 and vector P3) and the control points (vector P1 and vector P2) to find parameters ti of the intersecting points with the free-form curve (vector R(t)); the control points (vector P1 and vector P2) are set over again such that the total sum of distances di from the respective points (vector q2 to vector qm−1) of the point series (vector q1 to vector qm) to the free-form curve, (vector R(t)) determined by the parameters ti is smaller; and a free-form curve, (vector R(t)) assimilated to the point series (vector q1 to vector qm) is formed by the set nodal points (vector P0, vector P) and the reset control points (vector P1, vector P2).

Further, in accordance with a second aspect of the present invention, in a free-form surface forming method where a free-form surface is formed by setting internal control points (vector P11, vector P12, vector P21 and vector P22) in a framing space surrounded by boundary curves (COM1, COM2, COM3 and COM4) on a three-dimensional space and by pasting on the framing space a patch (vector S(u,v)) represented by a predetermined vector function (vector S(u,v)) on the basis of the boundary curves (COM1, COM2, COM3 and COM4) and the internal control points (vector P11, vector P12, vector P21 and vector P22): on the basis of coordinate data of a plurality of points (vector q1 to vector qm) the shortest distances di from the respective points (vector q1 to vector qm) to a reference patch (vector S(u,v)) are found; and a patch (vector S(u,v)) is generated by setting the internal control points (vector P11, vector P12, vector P21 and vector P22) such that the total sum of the shortest distances di is minimized.

Furthermore, in accordance with a third aspect of the present invention, in a free-form surface forming method where a free-form surface is formed by setting internal control points (vector P11, vector P12, vector P21 and vector P22) in a framing space surrounded by boundary curves (COM1, COM2, COM3 and COM4), on a three-dimensional space and by pasting on the framing space a patch (vector S(u,v)) represented by a predetermined vector function (vector S(u,v)) on the basis of the boundary curves (COM1, COM2, COM3 and COM4) and the internal control points (vector P11, vector P12, vector P21 and vector P22): the shortest distances di from a plurality of points (vector q1 to vector qm) to a patch (vector S(u,v)) formed on the framing space are found; internal control points (vector P11, vector P12, vector P21 and vector P22) are set on the framing space of the patch (vector S(u,v)) such that the total sum of the shortest distances di is minimized; and a patch (vector S(u,v)) of which the contour is represented by the plurality of points (vector q1 to vector qm) is generated.

Moreover, in accordance with a fourth aspect of the present invention, in a free-form surface forming method where a free-form surface is formed by setting internal control points (vector P11, vector P12, vector P21 and vector P22) in a framing space surrounded by boundary curves (COM1, COM2, COM3 and COM4), on a three-dimensional space and by pasting on framing space a patch (vector S(u,v)) represented by a predetermined vector function (vector S(u,v)) on the basis of the boundary curves (COM1, COM2, COM3 and COM4) and the internal control points (vector P11, vector P12, vector P21 and vector P22): a plurality of points (vector q1 to vector qm) are set on a patch vector to be transformed; the shortest distances di from the plurality of points (vector q1 to vector qm) to a patch (vector S(u,v)M) which is the target of transformation are found; internal control points (vector P11, vector P12, vector P21 and vector P22) are set on the framing space of the patch (S(u,v)) to be transformed such that the total sum of the shortest distances di is minimized; and a patch (vector S(u,v)) having surface geometry which is the target of transformation is generated on the framing space of the patch (vector S(u,v)) to be deformed.

Perpendiculars are drawn to the free-form curve (vector R(t)) defined by the nodal points (vector P0 and vector P3) and control points (vector P1 and vector P2) to find parameters ti of the intersecting points with the free-form curve (vector R(t)); and the control point vectors (vector P1 and vector P2) are set over again such that the total sum of distances di from the respective points (vector q2 to vector qm-1) of an input point series (vector q1 to vector qm) to the free-form curve (vector R(t)) determined by the parameter ti is minimized. As a result, a free-form curve (vector R(t)) assimilated to the point series (vector q1 to vector qm) may readily be formed by the set nodal points (vector P0 and vector P3) and reset control points (vector P1 and vector P2), i.e., the free-form curve (vector R(t)) may be generated by inputting the series of points (vector q1 to vector qm).

Further, the shortest distances di from the respective points (vector q1 to vector qm) to the reference patch (vector S(u,v)) are found on the basis of the coordinate data of the plurality of points (vector q1 to vector qm); and internal control points (vector P1, vector P12, vector P21 and vector P22) are set such that the total sum of the shortest distances di is minimized, to generate a patch (vector S(u,v)). As a result, a patch vector S(u,v) having a desired surface geometry may be generated.

If, at this time, the internal control points (vector P11, vector P12, vector P21 and vector P22) are set on the framing space of the patch (vector S(u,v)) to generate the patch (vector S(u,v)) of which the contour geometry is represented by a plurality of points, (vector q1 to vector qm) it is possible by inputting, for example, a group of points (vector q1 to vector qm) to generate the patch (vector S(u,v)) having its contour consisting of the group of points (vector al to vector qm). Further, a plurality of points (vector q1 to vector qm) are set on the patch (vector S(u,v)) which is to be transformed; and internal control points (vector P11, vector P12, vector P21 and vector P22) are set in the framing space of the patch (S(u,v)) to be transformed such that the total sum of the shortest distances di to a patch (vector S(u,v)M) which is the target of transformation is minimized. As a result, a patch (vector S(u,v)E) having the original surface contour may be obtained even such as when the framing space is processed to be modified.

The nature, principle and utility of the invention will become more apparent from the following detailed description when read in conjunction with the accompanying drawings in which like parts are designated by like reference numerals or characters.

DETAILED DESCRIPTION OF THE INVENTION

Figure 2:
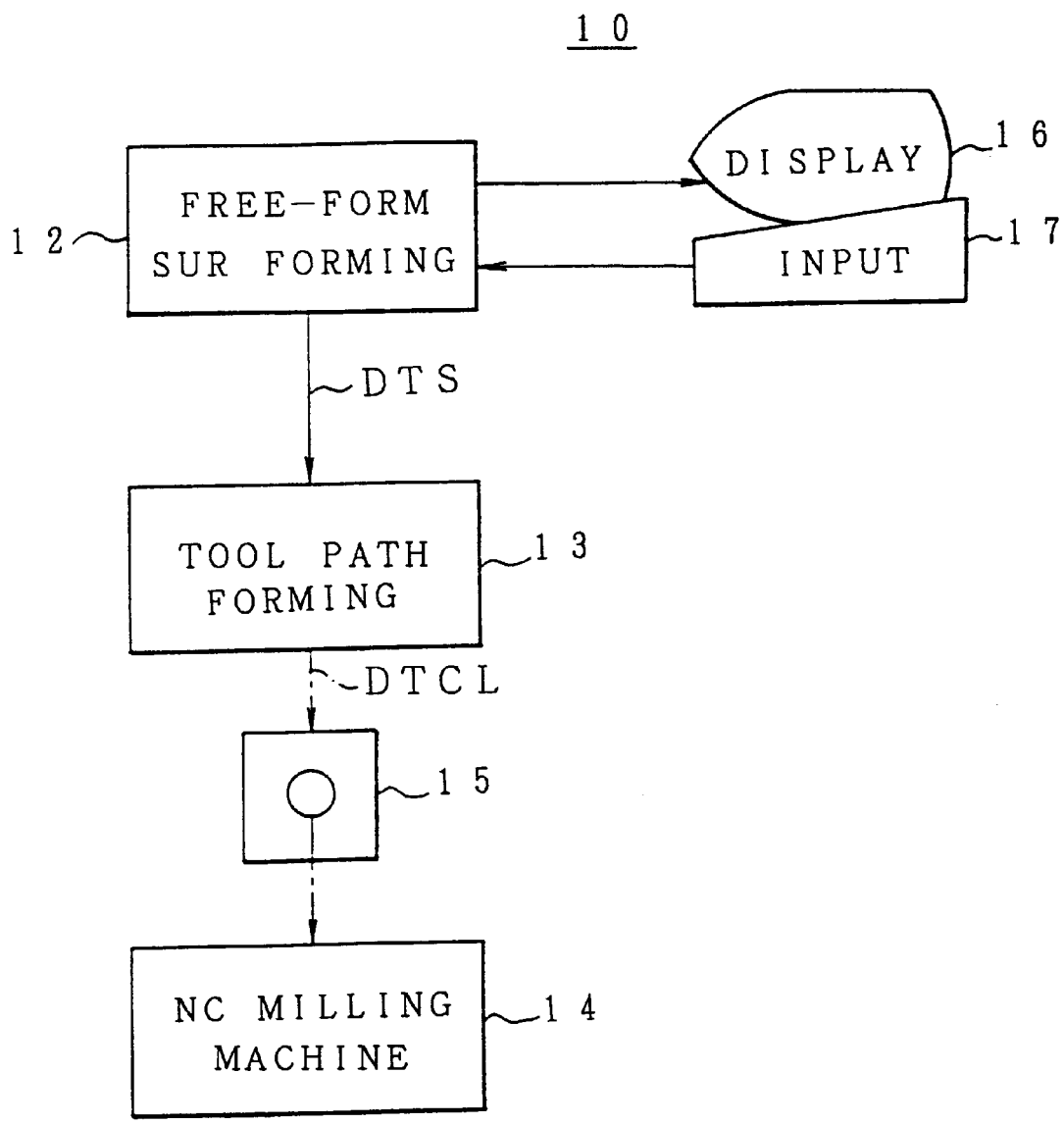
FIG. 2 is a block diagram showing the overall construction of a CAD/CAM system according to an embodiment of the present invention.

Preferred embodiments of this invention will be described with reference to the accompanying drawings: Overall Construction of CAD/CAM system Referring to FIG. 2, numeral 10 is generally a CAD/CAM system in which, after forming geometrical data DTS representing a free-form surface at a free-form surface forming unit 12, processing data DTCL for machining is formed at a tool path forming unit 13.

Specifically, the free-form surface forming unit 12 has a central processing unit (CPU). An input unit 17 is operated in response to the display on a display unit 16 to paste patches on a wire-frame model designated and inputted by the designer, using a third-order Bezier expression. Thereafter the patches are connected over again to form the geometric data DTS of as object having a free-form surface.

On the other hand, the tool path forming unit 13 forms a processing data DTCL for rough machining and finishing of a mold on the basis of the geometric data DTS and then outputs the processing data DTCL for rough machining and finishing to an NC milling machine 14, for example, by way of a floppy disk 15.

The NC milling machine 14 drives, for example, an NC fraise on the basis of the processing data DTCL and thereby forms a mold of the product represented by the geometric data DTS.

Formation of Free-Form Curves
(1) Theory of Free-Form Curves

Figure 3:
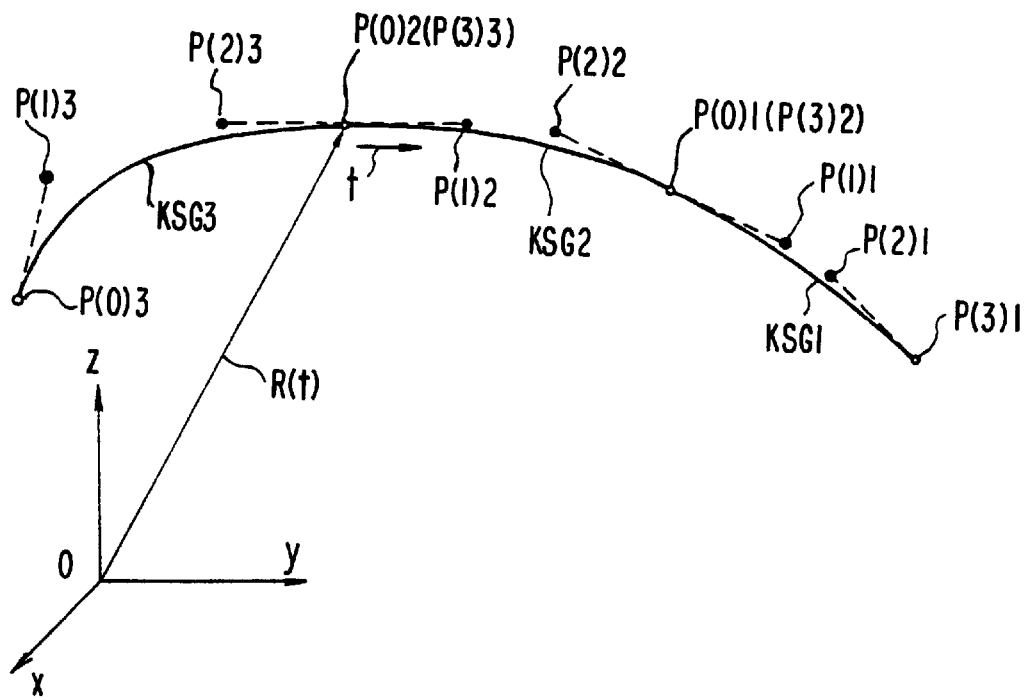
FIG. 3 is a schematic diagram for the explanation of a free-form curve.

Here, as shown in FIG. 3, a Bezier curve is represented by a parametric space curve vector R(t) which is expressed by the following formula using a third order Bezier expression:

$$R(t)=(1-t+tE)^3 P0 \qquad (6)$$

Here, t is a parameter varying from value 0 to value 1 as shown in the following formula in the course from one nodal point vector P0 to the other nodal point vector P3 in the direction along curve segments KSG:

$$0 \leq t \leq 1 \qquad (7)$$

With the curve segments KSG represented in this manner by a third order Bezier expression, the respective points on the curve segments KSG are expressed as position vector R(t) from the origin of an XYZ space by the expansion of the following formula by designating two control points, vector P1 and vector P2, between the nodal points, vector P0 and vector P3, by means of a shift operator E:

$$R(t)=(1-t)^3 P0+3(1-t)^2 tP1+3(1-t)t^2 P2+t^3 P3 \qquad (8)$$

Here, the shift operator E is related to control points vector Pi on curve segments KSG follows:

$$E \cdot Pi = Pi+1 \qquad (9)$$

$$i=0, 1, 2 \qquad (10)$$

Thus, a calculation is possible as shown in the following formula:

$$R(t)=(1-t+tE)^3 P0$$

$$=\{(1-t)^3+3(1-t)^2 tE+3(1-t)t^2 E^2+t^3 E^3\}P0$$

$$=(1-t)^3 P0+3(1-t)^2 tEP0+3(1-t)t^2 E^2 P0+t^3 E^3 P0$$

$$=(1-t)^3 P0+3(1-t)^2 tP1+3(1-t)t^2 P2+t^3 P3 \qquad (11)$$

by expanding formula (6) and substituting the relation of formula (9) and, as a result, formula (8) is obtained.

Thus, the respective curve segments KSG1, KSG2 and KSG3 expressed by the third order Bezier expression may be represented on the basis of formula (8) respectively by two nodal points and two control points, vector P(0)1–P(0)3, vector P(1)1–P(1)3, vector P(2)1–P(2)3 and vector P(3)1–P(3)3. And, by setting control points, vector. P(1)1–P(1)3 and vector P(2)1–P(2)3, between the nodal points, vectors P(0)1–P(0)3 and P(3)1, the segments may be set to a geometry which passes through the nodal points, vectors P(0)1–P(0)3 and P(3)1 and is defined by the control points, vector P(0)1–P(0)3, vector P(1)1–P(1)3, vector P(2)1–P(2)3 and vector P(3)1–P(3)3.

(2) Generation of Curve Segments

Figure 4:
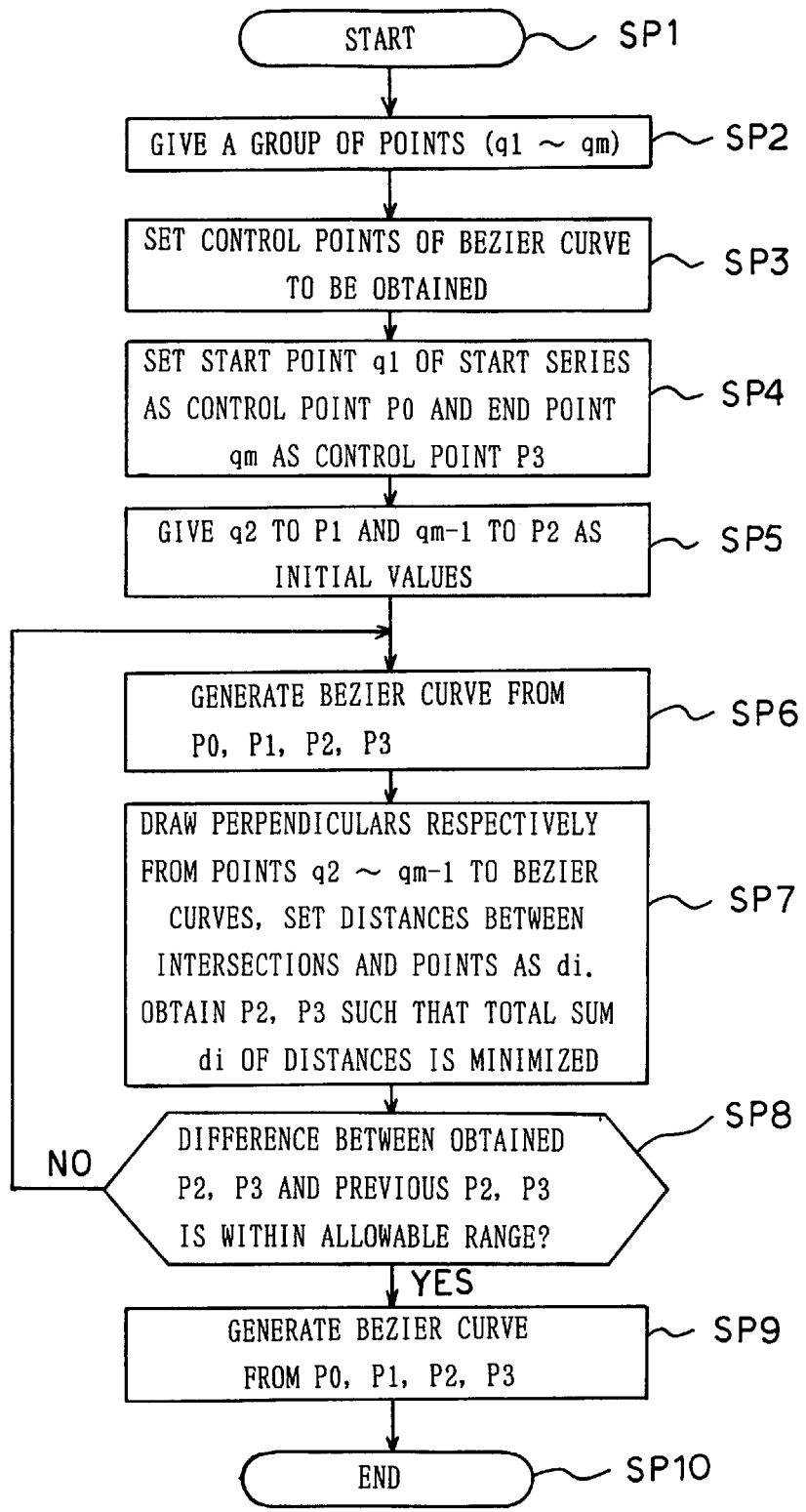
FIG. 4 is a flowchart showing the generating procedure of a curve segment thereof.

The free-form surface forming unit 12 executes a processing procedure as shown in FIG. 4 to generate a group of curves assimilated in geometry to a group of points designated by the designer.

Figure 5:
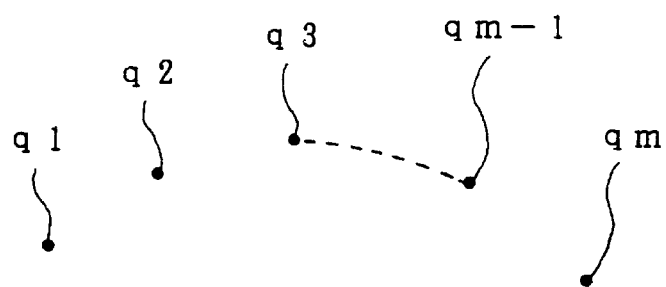
FIG. 5 is a schematic diagram showing a series of points that have been input.

Specifically, the execution of the free-form surface forming unit 12 proceeds from step SP1 to step SP2 where, as shown in FIG. 5, it takes in coordinate data of a series of points, vector q1, vector q2, vector q3, vector q4, . . . , vector qm which are input by the designer via the input unit 17.

Figure 6:
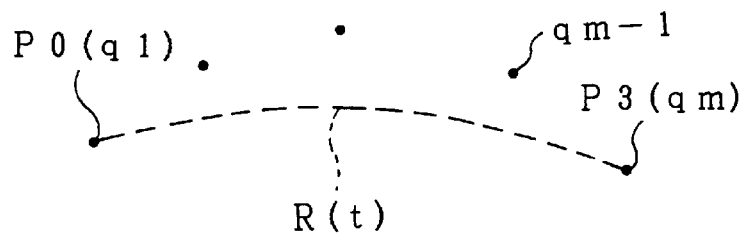
FIG. 6 is a schematic diagram for the explanation of temporary setting of a Bezier curve.

Subsequently, the free-form surface forming unit 12 proceeds to step SP3 where Bezier curve vector R(t) is temporarily set, and it then proceeds to step SP4 where, after finding a start point vector q1 and as end point vector qm with respect to the input point series, vector q1, vector q2, vector q3, vector q4, . . . , vector qm, the start point vector q1 and the end point vector qm are set, as shown in FIG. 6, as the nodal points, vector P0 and vector P3, of the Bezier curve vector R(t).

Figure 7:
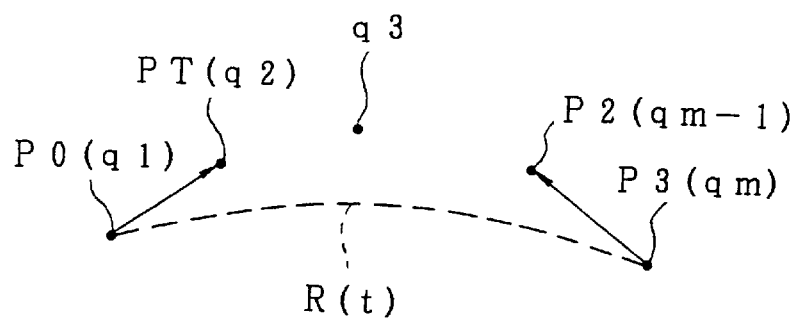
FIG. 7 is a schematic diagram for the explanation of temporary setting of control points.
Figure 8:
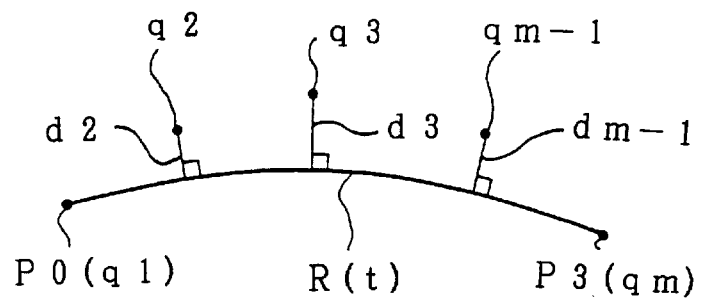
FIG. 8 is a schematic diagram for the explanation of detection processing of distances.

Subsequently, the free-form surface forming unit 12 proceeds to step SP5 where, as shown in FIG. 7, the control points, vector P1 and vector P2, of the Bezier curve vector R(t) are set respectively to a point vector q2 adjoining the start point vector q1 and a point vector qm−1 adjoining the end point vector qm.

Subsequently, the free-form surface forming unit 12 proceeds to step SP6 where, as shown in FIG. 7, it generates a Bezier curve vector R(t) formed of the nodal points, vector q1 and vector qm, and control points, vector q2 and vector qm−1, and then it proceeds to step SP7.

Here, the free-form surface forming unit 12 draws perpendiculars from the respective points, vector q2 to vector gm−1, excepting the start point vector q1 and the end point vector qm, to the Bezier curve vector R(t) and finds the total sum S of the distances thereof.

Here, by assuming:

$$at0 = (1-t)^3 \tag{12}$$

$$at1 = 3(1-t)^2 t \tag{13}$$

$$at2 = 3(1-t)t^2 \tag{14}$$

$$at3 = t^3 \tag{15}$$

formula (11) may be represented by the following formula:

$$R(t) = at0 \cdot P0 + at1 \cdot P1 + at2 \cdot P2 + at3 \cdot P3 \tag{16}$$

Here, since, in this embodiment, the start point vector q1 and the end point vector qm are set as the nodal points, vector P0 and vector P1, of the Bezier curve vector R(t), it may further be represented by the following formula:

$$R(t) = at0 \cdot q1 + at1 \cdot P1 at2 \cdot P2 + at3 \cdot qm \tag{17}$$

Thus, by setting over again the control points, vector P1 and vector P2, such that the geometry of the curve segments represented by formula (17) are assimilated to the input point series, vector q1, vector q2, vector q3, vector q4, . . . , vector qm, a free-form curve having a similar geometry may be generated.

Specifically, the coordinate value (x1, y1, z1), (x2, y2, z2) of the control points, vector P1 and vector P2, are set as unknowns and they are found.

Further, since the control points, vector P1 and vector P2, have been temporarily set respectively as the point vector q2 adjoining the start point vector q1 and the point vector qm−1 adjoining the end point vector qm, formula (17) may be represented by the following formula:

$$R(t) = at0 \cdot q1 + at1 \cdot q2 + at2 \cdot qm-1 + at3 qm \tag{18}$$

Here, the free-form surface forming unit 12 draws perpendiculars from the respective points, vector q2 to vector qm−1, to the Bezier curve R(t) and detects parameter ti in sequence for the intersecting points with the perpendiculars with respect to the Bezier curve vector R(t).

Further, the obtained parameter ti is substituted in sequence for the formula (18) to obtain the distance di from the respective vector q2 to vector qm−1 to the Bezier curve vector R(t) which defined by the parameter ti.

Thus, the sum S of the square of the distances di may be expressed by the following formula:

$$f(x1, y1, z1, x2, y2, z2) = \sum_{i=2}^{m-1} di^2 \tag{19}$$

$$= \sum_{i=2}^{m-1} \{(R(ti)x - qix)^2 + (R(ti)y - qiy)^2 + R(ti)_z - qiz)^2\}$$

and the coordinate values (x1, y1, z1), (x2, y2, z2) of the control points, vector P1 and vector P2, minimizing the sum are obtained.

At this time, if the Bezier curve vector R(t) and the perpendicular do not intersect with each other, the free-form surface forming unit 12 selects the closer one of the start point vector q1 or the end point vector qm to obtain the distance di.

Here, formula (19) is differentiated respectively by the six variables, x1, y1, z1, x2, y2 and z2 to be represented by the following formulas:

$$\frac{df}{dx1} = \sum_{i=2}^{m-1} \left\{ (R(ti)x - qix) \frac{dR(t)x}{dx1} \right\} = 0 \tag{20}$$

$$\frac{df}{dy1} = \sum_{i=2}^{m-1} \left\{ (R(ti)y - qiy) \frac{dR(t)y}{dy1} \right\} = 0 \tag{21}$$

$$\frac{df}{dz1} = \sum_{i=2}^{m-1} \left\{ (R(ti)z - qiz) \frac{dR(t)z}{dz1} \right\} = 0 \tag{22}$$

$$\frac{df}{dx2} = \sum_{i=2}^{m-1} \left\{ (R(ti)x - qix) \frac{dR(t)x}{dx2} \right\} = 0 \tag{23}$$

$$\frac{df}{dy2} = \sum_{i=2}^{m-1} \left\{ (R(ti)y - qiy) \frac{dR(t)y}{dy2} \right\} = 0 \tag{24}$$

$$\frac{df}{dz2} = \sum_{i=2}^{m-1} \left\{ (R(ti)z - qiz) \frac{dR(t)z}{dz2} \right\} = 0 \tag{25}$$

Thus, by setting the following formulas:

$$\frac{dR(t)x}{dx1} = at1 \tag{26}$$

$$\frac{dR(t)y}{dy1} = at1 \tag{27}$$

$$\frac{dR(t)z}{dz1} = at1 \tag{28}$$

$$\frac{dR(t)x}{dx2} = at2 \tag{29}$$

-continued $$\frac{dR(t)y}{dy2} = at2 \quad (30)$$

$$\frac{dR(t)z}{dz2} = at2 \quad (31)$$

and by substituting them for formula (17), it may be represented as the following formulas:

$$\frac{df}{dx1} = \sum_{i=2}^{m-1}\{(at0\cdot q1x + at1\cdot x1 + at2\cdot x2 + at3\cdot qmx - qix)at1\} \quad (32)$$

$$\frac{df}{dy1} = \sum_{i=2}^{m-1}\{(at0\cdot q1y + at1\cdot y1 + at2\cdot y2 + at3\cdot qmy - qiy)at1\} \quad (33)$$

$$\frac{df}{dz1} = \sum_{i=2}^{m-1}\{(at0\cdot q1z + at1\cdot z1 + at2\cdot z2 + at3\cdot qmz - qiz)at1\} \quad (34)$$

$$\frac{df}{dx2} = \sum_{i=2}^{m-1}\{(at0\cdot q1x + at1\cdot x1 + at2\cdot x2 + at3\cdot qmx - qix)at2\} \quad (35)$$

$$\frac{df}{dy2} = \sum_{i=2}^{m-1}\{(at0\cdot q1y + at1\cdot y1 + at2\cdot y2 + at3\cdot qmy - qiy)at2\} \quad (36)$$

$$\frac{df}{dz2} = \sum_{i=2}^{m-1}\{(at0\cdot q1z + at1\cdot z1 + at2\cdot z2 + at3\cdot qmz - qiz)at2\} \quad (37)$$

from this it is seen that it suffices to solve the two-way linear equations as shown by the following formulas:

$$\begin{bmatrix} \sum_{i=2}^{m-1}(at1\cdot at1) & \sum_{i=2}^{m-1}(at2\cdot at1) \\ \sum_{i=2}^{m-1}(at1\cdot at2) & \sum_{i=2}^{m-1}(at2\cdot at2) \end{bmatrix}\begin{bmatrix} x1 \\ x2 \end{bmatrix} = \begin{bmatrix} -\sum_{i=2}^{m-1}(at0\cdot q1x + at3\cdot qm - 1x - qix)\cdot at1 \\ -\sum_{i=2}^{m-1}(at0\cdot q1x + at3\cdot qm - 1x - qix)\cdot at2 \end{bmatrix} \quad (38)$$

$$\begin{bmatrix} \sum_{i=2}^{m-1}(at1\cdot at1) & \sum_{i=2}^{m-1}(at2\cdot at1) \\ \sum_{i=2}^{m-1}(at1\cdot at2) & \sum_{i=2}^{m-1}(at2\cdot at2) \end{bmatrix}\begin{bmatrix} y1 \\ y2 \end{bmatrix} = \begin{bmatrix} -\sum_{i=2}^{m-1}(at0\cdot q1y + at3\cdot qm - 1y - qiy)\cdot at1 \\ -\sum_{i=2}^{m-1}(at0\cdot q1y + at3\cdot qm - 1y - qiy)\cdot at2 \end{bmatrix} \quad (39)$$

$$\begin{bmatrix} \sum_{i=2}^{m-1}(at1\cdot at1) & \sum_{i=2}^{m-1}(at2\cdot at1) \\ \sum_{i=2}^{m-1}(at1\cdot at2) & \sum_{i=2}^{m-1}(at2\cdot at2) \end{bmatrix}\begin{bmatrix} z1 \\ z2 \end{bmatrix} = \begin{bmatrix} -\sum_{i=2}^{m-1}(at0\cdot q1z + at3\cdot qm - 1z - qiz)\cdot at1 \\ -\sum_{i=2}^{m-1}(at0\cdot q1z + at3\cdot qm - 1z - qiz)\cdot at2 \end{bmatrix} \quad (40)$$

Thereby, the free-form surface forming unit 12 executes calculation processing of formulas (38) through (40) with respect to the respective points, vector q2 to vector qm−1, and, upon the detection of the coordinate values (x1, y1, z1), (x2, y2, z2) of the control points, vector P1 and vector P2, it proceeds to step SP8.

Here, the free-form surface forming unit 12 detects the distances from the control points, vector P1 and vector P2, which are temporarily set respectively to the control points, vector P1 and vector P2, which are detected at step SP7, and it judges whether the distances are within an allowable range.

Here, if a negative result is obtained, the free-form surface forming unit 12 returns to step SP6 where a Bezier curve is generated anew using the control points, vector P1, vector P2, detected at step SP7, and it draws perpendiculars from the respective points, vector q2 to vector qm−1 to the Bezier curve to detect parameter ti with respect to the intersections of the perpendiculars.

Thereby, the free-form surface forming unit 12: repeats a loop LOOP1 consisting of steps SP6–SP7–SP8–SP6; detects parameter ti with respect to the intersections of the perpendiculars drawn from the respective points, vector q2 to vector qm−1, to the Bezier curve vector R(t); generates a Bezier curve vector R(t) such that the sum of squares of the distances di is minimized in the state where the parameter ti is kept at a constant value; and, with respect to the resulted Bezier curve vector R(t), repeats again the detection of the parameter ti and the generation of the Bezier curve vector R(t).

In practice, in a vector function using such parameter t, if the parameter t is used as the variable, it becomes difficult to obtain a solution in a simple manner.

Figure 9:
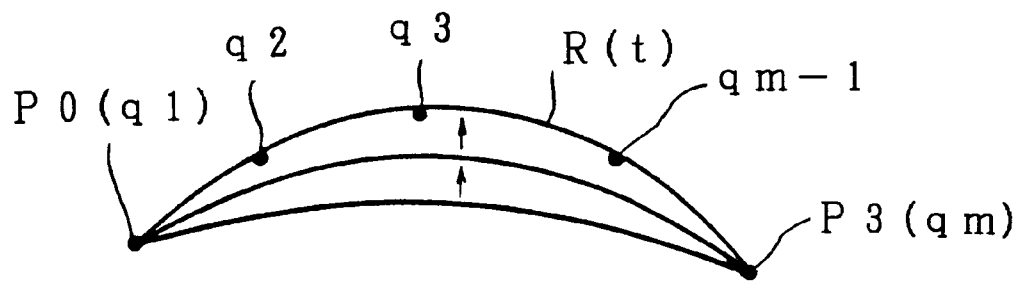
FIG. 9 is a schematic diagram for the explanation of the repetition of generation processing of a Bezier curve.

However, if the parameter ti is kept at a constant value by setting as the norm the intersections of the perpendiculars from the respective points, vector q2 to vector qm−1, to the Bezier curve vector R(t) so as to repeat the generation of the curve vector R(t), the value of the parameter t corresponding to the respective points vector q2 to vector qm−1 may be made closer to the optimal values as shown in FIG. 9 every time when the generation of the Bezier curve vector R(t) is repeated, whereby a solution may be obtained in a simple manner.

Thus, by repeating such processing, a free-form curve similar to point series, vector q1 to vector qm, may be generated and, accordingly, a free-form curve may be generated by inputting a point series.

In this manner, when the change in control points, vector P1 and vector P2, become smaller as the generation of Bezier curve vector R(t) is repeated, an affirmative result is obtained. Thereby, the free-form surface forming unit 12 proceeds to step SP9 where it generates a Bezier curve and then proceeds to step SP10 where the processing procedure is terminated.

Thus, a free-form curve assimilated to a point series may be formed in a simple manner such that: the start point and the end point series are set as the nodal points; perpendiculars are drawn from each of the input points to detect the parameter of the intersections with the free-form curve; and the control points are set over again so that the distances from the respective points of the point series to the free-form curve determined by the parameter is minimized. Thus, a free-form curve may be generated by inputting the point series.

Thus, the operability of the free-form surface forming unit may be correspondingly improved.

Generation of Free-Form Surface

Figure 10:
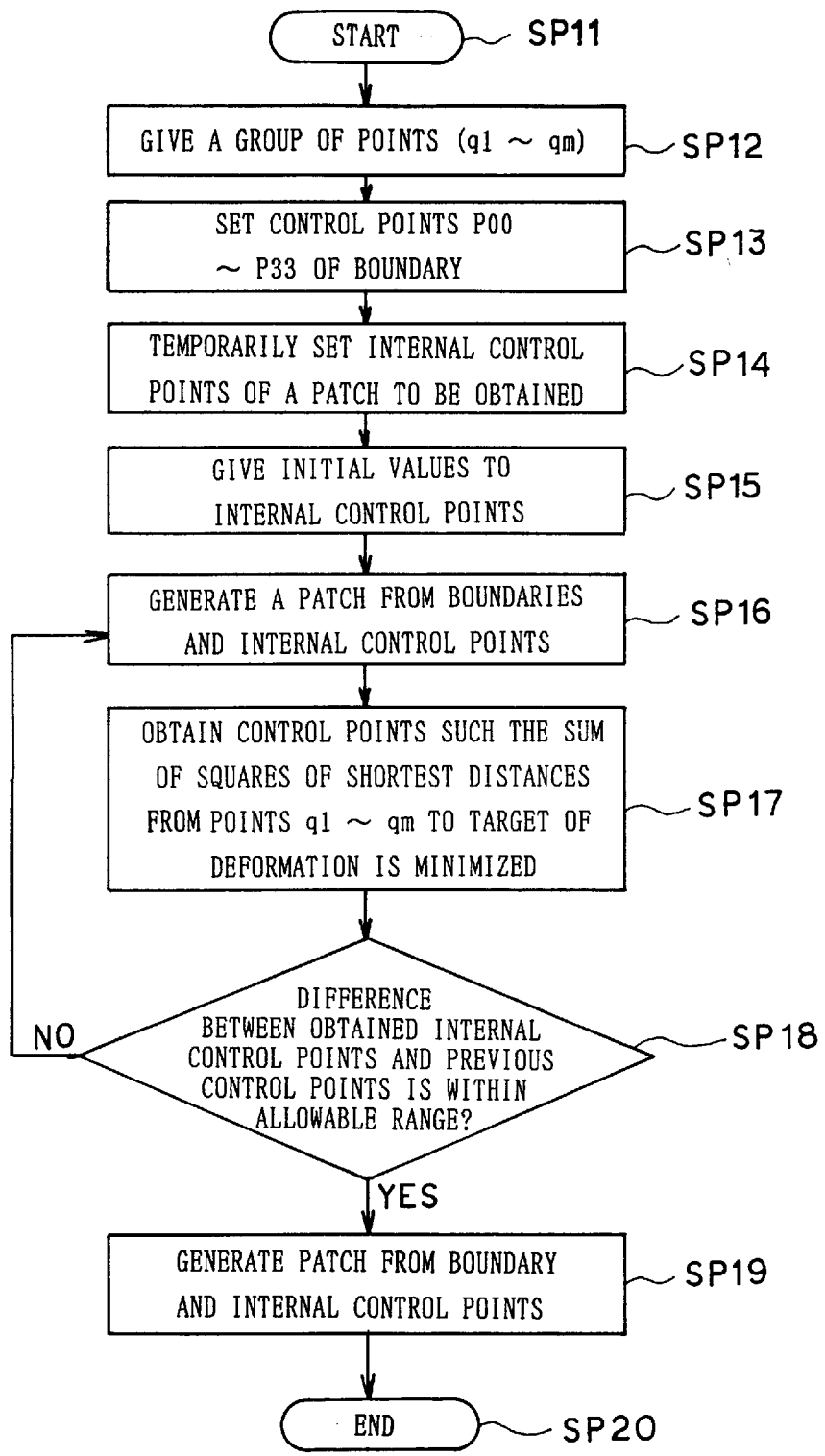
FIG. 10 is a flowchart showing the processing procedure of the formation of free-form surface.

When in this manner a wire-frame model is generated by forming free-form curve, the free-form surface forming unit 12 executes the processing procedure as shown in FIG. 10 to generate a free-form surface by setting a point group input by the operator as the norm.

Figure 11:
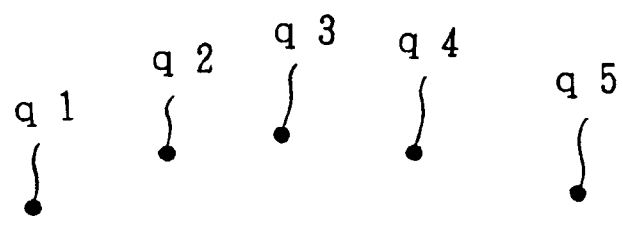
FIG. 11 is a schematic diagram showing a group of points that have been input.
Figure 11:
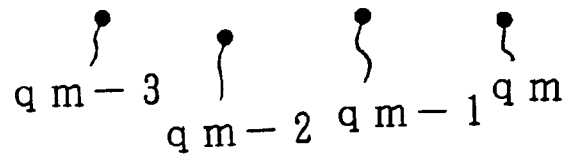

Specifically, the free-form surface forming unit 12 proceeds from step SP11 to step SP12 where, as shown in FIG. 11, it takes in the coordinate data of a point group, vector q1, vector q2, vector q3, vector q4, . . . , vector qm which are input by the designer via the input unit 17.

Figure 12:
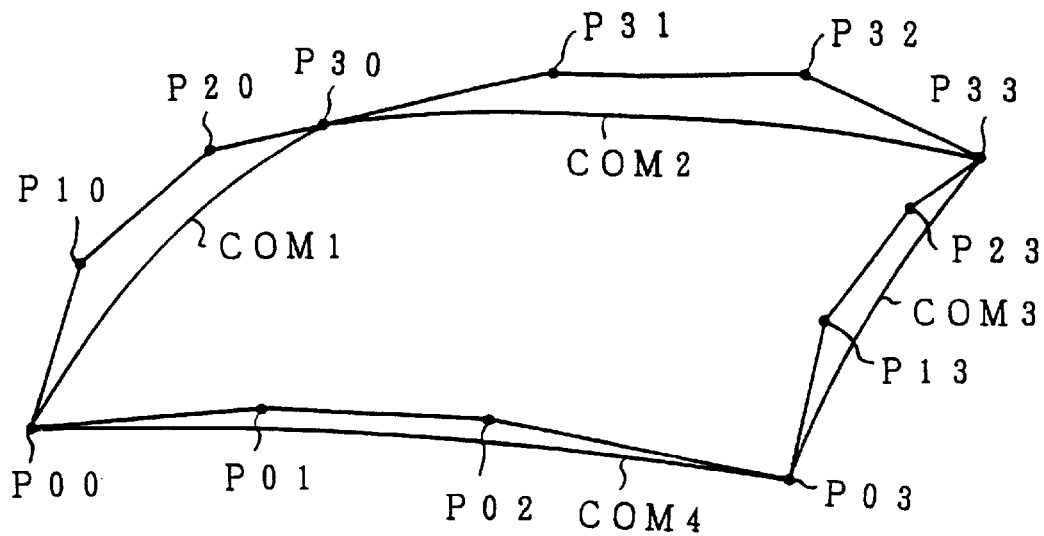
FIG. 12 is a schematic diagram for the explanation of the formation of boundary curves.

Subsequently, the free-form surface forming unit 12 proceeds to step SP13 where, as shown in FIG. 12, control points, vector P00 to vector P33, of the boundary curves COM1–COM4 corresponding to the point group, vector q1 to vector qm, are set.

This setting process is executed such that: a framing space surrounding the point group, vector q1 to vector qm, is selected with respect to the free-form curve group generated by the above described free-form curve forming method; control points, vector PO to vector P3 are selected with respect to the free-form curve of the framing space so as to set them respectively as control points, vector P00 to vector P33.

Subsequently, the free-form surface forming unit 12 proceeds to step SP14 where internal control points, vector P11, vector P12, vector P21 and vector P22, are set in the framing space surrounded by the boundary curves COM1–COM4.

Figure 13:
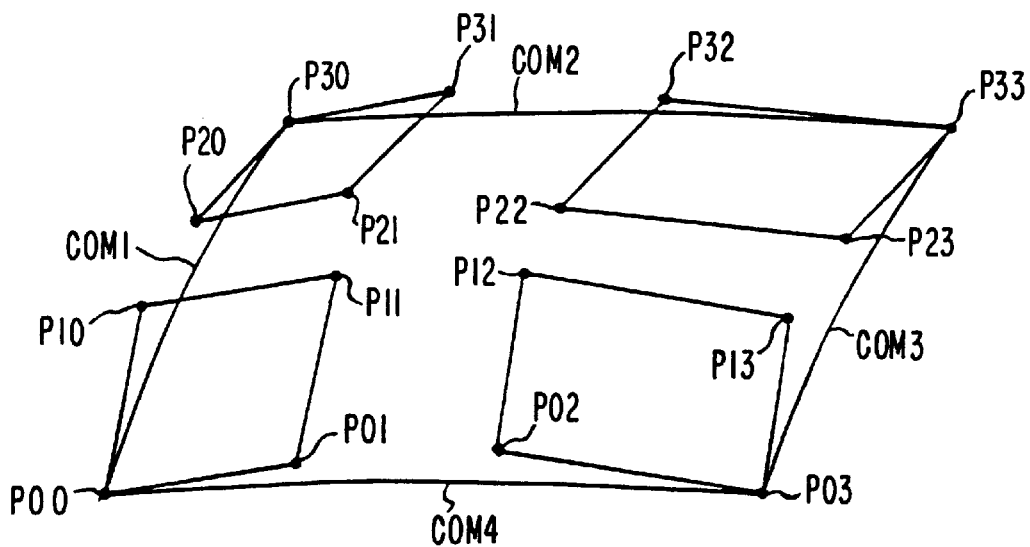
FIG. 13 is a schematic diagram for the explanation of setting of internal control points.

As shown in FIG. 13, in this embodiment, the free-form surface forming unit 12 generates a free-form surface having a geometry represented by the input point group, vector q1 to vector qm, by repeatedly setting over again the set internal control points, vector P11, vector P12, vector P21 and vector P22.

Specifically, the free-form surface forming unit 12: assigns the coordinate data of the internal control points, vector P11, vector P12, vector P21 and vector P22 respectively to (x11, y11, z11), (x12, y12, z12), (x21, y21, z21) and (x22, y22, z22); selects the (x11, y11, z11), (x12, y12, z12), (x21, y21, z21) and (x22, y22, z22) so that the distances to the input point group, vector q1 to vector qm, are made less than a predetermined value; and thereby generates a patch vector S(u,v) having a geometry represented by the point group, vector q1 to vector qm.

Here, upon setting the internal control points, vector P11, vector P12, vector P21 and vector P22, the free-form surface forming unit 12 proceeds to step SP15 where it sets the coordinate data (x11, y11, z11), (x12, y12, z12), (x21, y21, z21) and (x22, y22, z22) of the internal control points, vector P11, vector P12, vector P21 and vector P22, to initial values.

Here, the free-form surface forming unit 12 executes the calculations of the following formulas:

$$P11 = P01 + P10 - P00 \quad (41)$$

$$P12 = P02 + P13 - P03 \quad (42)$$

$$P21 = P20 + P31 - P30 \quad (43)$$

$$P22 = P23 + P32 - P33 \quad (44)$$

and sets the coordinate data (x11, y11, z11), (x12, y12, z12), (x21, y21, z21) and (x22, y22, z22) of the internal control points, vector P11, vector P12, vector P21 and vector P22, to initial values such that parallelograms are formed respectively by: the internal control point vector P11, the control points, vector P00, vector P01 and vector P10; the internal control point vector P12, the control points, vector P03, vector P13 and vector P02; the internal control point vector P21, the control points, vector P30, vector P20 and vector P31; the internal control point vector P22, the control points, vector P33, vector P32 and vector P23.

Subsequently, the free-form surface forming unit 12 proceeds to step SP16 where it generates a patch vector S(u,v) which is determined by the control points, vector P00 to vector P33, and the internal control points, vector P11 to vector P22, and then proceeds to step SP17 where the minimum value of the sum of squares of the distances di from the respective points of the group, vector q1 to vector qm, to the patch vector S(u,v) is found.

Figure 14:
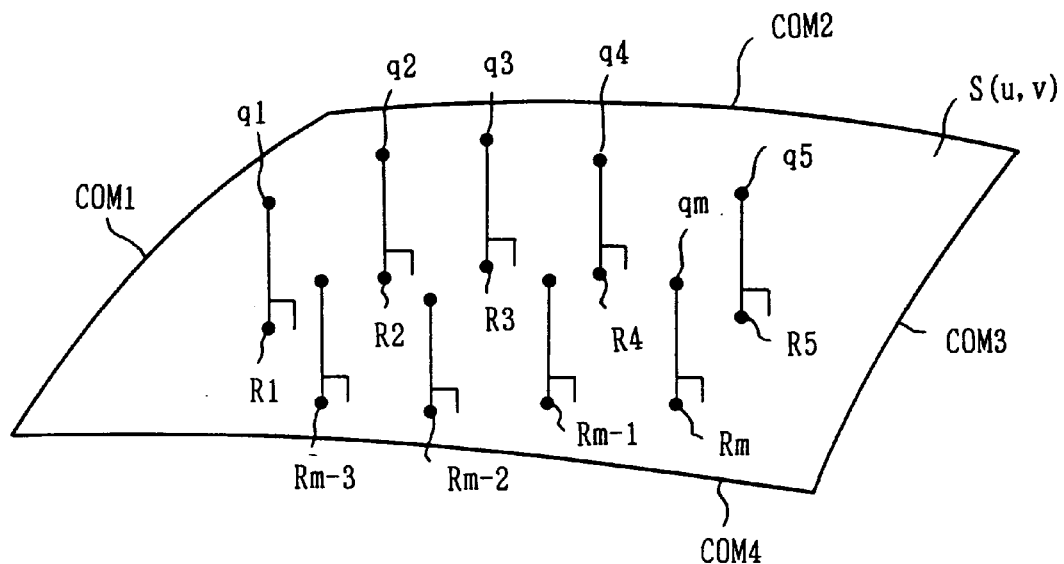
FIG. 14 is a schematic diagram for the explanation of detection processing of distances from a group of points to a patch.

Specifically, as shown in FIG. 14, the free-form surface forming unit 12 draws perpendiculars from the respective input points, vector q1 to vector qm, to the patch vector S(u,v) to find intersections, vector R1 to vector Rm.

Further, the free-form surface forming unit 12 finds parameters (u1,v1), (u2,v2), . . . , (um,vm) on the patch vector S(u,v) with respect to each of the intersections, vector R1 to vector Rm.

Figure 15:
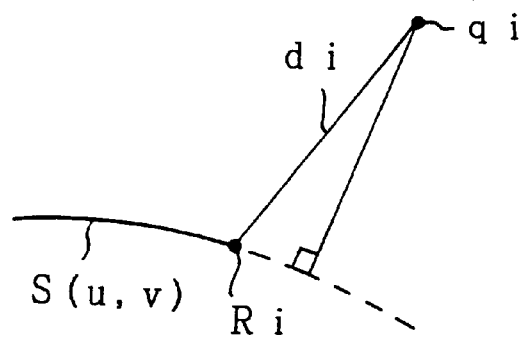
FIG. 15 is a schematic diagram for the explanation of processing in the case where a perpendicular cannot be drawn to the patch.

If, as shown in FIG. 15, an intersection cannot be formed on the patch vector S(u,v) when respectively drawing a perpendicular from the points, vector q1 to vector qm, to the patch vector S(u,v), the free-form surface forming unit 12 sets the point on the patch vector S(u,v) closest to the points, vector q1 to vector qm, as the intersections, vector R1 to vector Rm, and finds parameters (u1,v1), (u2,v2), . . ., (um,vm) of the intersections, vector R1 to vector Rm.

Subsequently, the free-form surface forming unit 12 executes the calculation of the following formula:

$$\sum_{i=1}^{m} di^2 = \sum_{i=1}^{m} \{(S(ui, vi)x - qix)^2 + \quad (45)$$
$$(S(ui, vi)y - qiy)^2 + (S(ui, vi)z - qiz)^2\}$$

to find the sum of squares of the distances di from the intersections, vector R1 to vector Rm, to the corresponding points, vector q1 to vector qm. Here, R(ui,vi)x, R(ui,vi)y, R(ui,vi)z, (i=1–m) represents x, y, z coordinate values, respectively, of the intersections, vector R1 to vector Rm.

Here, if the sum of the squares of the minimum distances di represented by the formula (45) is given by the following formula:

$$f(x11, y11, z11, x12, y12, \quad (46)$$
$$z12, x21, y21, z21, x22, y22, z22) = \sum_{i=1}^{m} di^2$$

the sum of the squares is represented by using the coordinate data (x11, y11, z11), (x12, y12, z12), (x21, y21, z21) and (x22, y22, z22) of the internal control points, vector P11, vector P12, vector P21 and vector P22 as the variables.

Thereby, the free-form surface forming unit 12 finds the smallest distance from the point group to the patch and, on the basis of the found result, sets the internal control points, vector P11, vector P12, vector P21 and vector P22, such that the function represented by formula (46) takes its minimum value.

Thereby, at the free-form surface forming unit 12, it is possible to generate a free-form surface having the geometry represented by the input point group, vector q1 to vector qm.

Here, by decomposing formula (1) and substituting the relation expressed by formula (2) and formula (3) therefor, patch vector (s,v) may be represented by the following formula:

$$S(u, v) = (1-u)^3(1-v)^3 P00 + (1-u)^3 3(1-v)^2 v P10 + \quad (47)$$
$$(1-u)^3 3(1-v)v^2 P20 + (1-u)^3 v^3 P30 +$$
$$3(1-u)^2 u(1-v)^3 P01 + 3(1-u)^2 u 3(1-v)^2 v P11 +$$
$$3(1-u)^2 u 3(1-v)v^2 P21 + 3(1-u)^2 u v^3 P31 +$$
$$3(1-u)u^2(1-v)^3 P02 + 3(1-u)u^2 3(1-v)^2 v P12 +$$
$$3(1-u)u^2 3(1-v)v^2 P22 + 3(1-u)u^2 v^3 P32 + u^3(1-v)^3 P03 +$$
$$u^3 3(1-v)^2 v P13 + u^3 3(1-v)v^2 P23 + u^3 v^3 P33$$

and, assuming:

$$(1-u)^3(1-v)^3 = drp00 \quad (48)$$
$$3(1-u)^2 u(1-v)^3 = drp01 \quad (49)$$
$$3(1-u)u^2(1-v)^3 = drp02 \quad (50)$$
$$u^3(1-v)^3 = drp03 \quad (51)$$
$$(1-u)^3 3(1-v)^2 v = drp10 \quad (52)$$
$$3(1-u)^2 u 3(1-v)^2 v = drp11 \quad (53)$$
$$3(1-u)u^2 3(1-v)^2 v = drp12 \quad (54)$$
$$u^3 3(1-v)^2 v = drp13 \quad (55)$$
$$(1-u)^3 3(1-v)v^2 = drp20 \quad (56)$$
$$3(1-u)^2 u 3(1-v)v^2 = drp21 \quad (57)$$
$$3(1-u)u^2 3(1-v)v^2 = drp22 \quad (58)$$
$$u^3 3(1-v)v^2 = drp23 \quad (59)$$
$$(1-u)^3 v^3 = drp30 \quad (60)$$
$$3(1-u)^2 u v^3 = drp31 \quad (61)$$
$$3(1-u)u^2 v^3 = drp32 \quad (62)$$
$$u^3 v^3 = drp33 \quad (63)$$

formula (47) may be represented as:

$$S(u, v) = drp00 \cdot P00 + drp10 \cdot P10 + drp20 \cdot P20 + drp30 \cdot P30 + \quad (64)$$
$$drp01 \cdot P01 + drp11 \cdot P11 + drp21 \cdot P21 + drp31 \cdot P31 +$$
$$drp02 \cdot P02 + drp12 \cdot P12 + drp22 \cdot P22 + drp32 \cdot P32 +$$
$$drp03 \cdot P03 + drp13 \cdot P13 + drp23 \cdot P23 + drp33 \cdot P33$$

Thus, by differentiating the function represented by formula (64) by the x-coordinate value x11 of the internal control point vector P11, may be represented by the following formula:

$$\frac{df}{dx11} = \sum_{i=1}^{m} \left\{ (S(ui, vi)x - qix) \frac{dSx}{dx11} \right\} = 0 \quad (65)$$

and, here, since the coordinate data (x11, y11, z11), (x12, y12, z12), (x21, y21, z21) and (x22, y22, z22) of the internal control points, vector P11, vector P12, vector P21 and vector P22, are consisting of variables, the relation of the following formula:

$$\frac{dSx}{dx11} = drp11 \quad (66)$$

may be obtained from formula (48).

Thus, it is seen that, by substituting formula (64), formula (65) may be represented by the following formula:

$$\frac{df}{dx11} = \sum_{i=1}^{m} \{(drp00 \cdot P00x + drp10 \cdot P10x + drp20 \cdot P20x + \quad (67)$$
$$drp30 \cdot P30x + drp01 \cdot P01x + drp11 \cdot x11 + drp21 \cdot x21 +$$
$$drp31 \cdot P31x + drp02 \cdot P02 + drp12 \cdot x12 + drp22 \cdot x22 +$$
$$drp32 \cdot P32x + drp03 \cdot P03x + drp13 \cdot P13x +$$
$$drp23 \cdot P23x + drp33 \cdot P33x - qix) \cdot drp11\}$$

In a similar manner, differentiating the function of formula (64) respectively by the y-coordinate value y11 and z-coordinate value z11 of the internal control point vector P11, to obtain:

$$\frac{df}{dy11} = \sum_{i=1}^{m} \left\{ (S(ui, vi)y - qiy) \frac{dSy}{dy11} \right\} = 0 \quad (68)$$

$$\frac{df}{dz11} = \sum_{i=1}^{m} \left\{ (S(ui, vi)y - qiz) \frac{dSz}{dz11} \right\} = 0 \quad (69)$$

from the relation of the following formulas:

$$\frac{dSy}{dy11} = drp11 \quad (70)$$

$$\frac{dSz}{dz11} = drp11 \quad (71)$$

formula (64) may be substituted to obtain the relation of the following formulas:

$$\frac{df}{dy11} = \sum_{i=1}^{m} \{(drp00 \cdot P00y + drp10 \cdot P10y + drp20 \cdot P20y + \quad (72)$$
$$drp30 \cdot P30y + drp01 \cdot P01y + drp11 \cdot y11 + drp21 \cdot y21 +$$
$$drp31 \cdot P31y + drp02 \cdot P02y + drp12 \cdot y12 + drp22 \cdot y22 +$$
$$drp32 \cdot P32y + drp03 \cdot P03y + drp13 \cdot P13y +$$
$$drp23 \cdot P23y + drp33 \cdot P33y - qiy) \cdot drp11\}$$

-continued $$\frac{df}{dy11} = \qquad (73)$$

$$\sum_{i=1}^{m} \{(drp00 \cdot P00z + drp10 \cdot P10z + drp20 \cdot P20z + drp30 \cdot P30z +$$

$$drp01 \cdot P01z + drp11 \cdot z11 + drp21 \cdot z21 +$$
$$drp31 \cdot P31z + drp02 \cdot P02z + drp12 \cdot z12 + drp22 \cdot z22 +$$
$$drp32 \cdot P32z + drp03 \cdot P03z + drp13 \cdot P13z +$$
$$drp23 \cdot P23z + drp33 \cdot P33z - qiz) \cdot drp11\}$$

In a similar manner, with respect to the coordinate value x12, y12 and z12 of the internal control point vector P12, supposing:

$$\frac{df}{dx12} = \sum_{i=1}^{m} \left\{ (S(ui,vi)x - qix) \frac{dSx}{dx12} \right\} = 0 \qquad (74)$$

$$\frac{df}{dy12} = \sum_{i=1}^{m} \left\{ (S(ui,vi)y - qiy) \frac{dSy}{dy12} \right\} = 0 \qquad (75)$$

$$\frac{df}{dz12} = \sum_{i=1}^{m} \left\{ (S(ui,vi)z - qiz) \frac{dSz}{dz12} \right\} = 0 \qquad (76)$$

from the relation of the following formulas:

$$\frac{dSx}{dx12} = drp12 \qquad (77)$$

$$\frac{dy}{dy12} = drp12 \qquad (78)$$

$$\frac{dSz}{dz12} = drp12 \qquad (79)$$

the relation of the following formulas:

$$\frac{df}{dx12} = \sum_{i=1}^{m} \{(drp00 \cdot P00x + drp10 \cdot P10x + drp20 \cdot P20x + \qquad (80)$$
$$drp30 \cdot P30x + drp01 \cdot P01x + drp11 \cdot x11 + drp21 \cdot x21 +$$
$$drp31 \cdot P31x + drp02 \cdot P02x + drp12 \cdot x12 + drp22 \cdot x22 +$$
$$drp32 \cdot P32x + drp03 \cdot P03x + drp13 \cdot P13x +$$
$$drp23 \cdot P23x + drp33 \cdot P33x - qix) \cdot drp12\}$$

$$\frac{df}{dy12} = \sum_{i=1}^{m} \{(drp00 \cdot P00y + drp10 \cdot P10y + drp20 \cdot P20y + \qquad (81)$$
$$drp30 \cdot P30y + drp01 \cdot P01y + drp11 \cdot y11 + drp21 \cdot y21 +$$
$$drp31 \cdot P31y + drp02 \cdot P02y + drp12 \cdot y12 +$$
$$drp22 \cdot y22 + drp32 \cdot P32y + drp03 \cdot P03y +$$
$$drp13 \cdot P13y + drp23 \cdot P23y + drp33 \cdot P33y - qiy) \cdot drp12\}$$

$$\frac{df}{dz12} = \sum_{i=1}^{m} \{(drp00 \cdot P00z + drp10 \cdot P10z + drp20 \cdot P20z + \qquad (82)$$
$$drp30 \cdot P30z + drp01 \cdot P01z + drp11 \cdot z11 + drp21 \cdot z21 +$$
$$drp31 \cdot P31z + drp02 \cdot P02z + drp12 \cdot z12 + drp22 \cdot z22 +$$
$$drp32 \cdot P32z + drp03 \cdot P03z + drp13 \cdot P13z +$$
$$drp23 \cdot P23z + drp33 \cdot P33z - qix) \cdot drp12\}$$

may be obtained.

In a similar manner, with respect to the coordinate values, x21, y21, z21, x22, y22 and z22 of the internal control points, vector P21 and vector P22, supposing:

$$\frac{df}{dx21} = \sum_{i=1}^{m} \left\{ (S(ui,vi)x - qix) \frac{dSx}{dx21} \right\} = 0 \qquad (83)$$

$$\frac{df}{dy21} = \sum_{i=1}^{m} \left\{ (S(ui,vi)y - qiy) \frac{dSy}{dy21} \right\} = 0 \qquad (84)$$

$$\frac{df}{dz21} = \sum_{i=1}^{m} \left\{ (S(ui,vi)z - qiz) \frac{dSz}{dz21} \right\} = 0 \qquad (85)$$

$$\frac{df}{dx22} = \sum_{i=1}^{m} \left\{ (S(ui,vi)x - qix) \frac{dSx}{dx22} \right\} = 0 \qquad (86)$$

$$\frac{df}{dy22} = \sum_{i=1}^{m} \left\{ (S(ui,vi)y - qiy) \frac{dSx}{dy22} \right\} = 0 \qquad (87)$$

$$\frac{df}{dz22} = \sum_{i=1}^{m} \left\{ (S(ui,vi)z - qiz) \frac{dSz}{dz22} \right\} = 0 \qquad (88)$$

from the relation of the following formulas:

$$\frac{dSx}{dx21} = drp21 \qquad (89)$$

$$\frac{dSy}{dy21} = drp21 \qquad (90)$$

$$\frac{dSz}{dz21} = drp21 \qquad (91)$$

$$\frac{dSx}{dx22} = drp22 \qquad (92)$$

$$\frac{dSy}{dy22} = drp22 \qquad (93)$$

$$\frac{dSa}{dz22} = drp22 \qquad (94)$$

the relation of the following formulas:

$$\frac{df}{dx21} = \sum_{i=1}^{m} \{(drp00 \cdot P00x + drp10 \cdot P10x + \qquad (95)$$
$$drp20 \cdot P20x + drp30 \cdot P30x + drp01 \cdot P01x +$$
$$drp11 \cdot x11 + drp21 \cdot x21 + drp31 \cdot P31x +$$
$$drp02 \cdot P02x + drp12 \cdot x12 + drp22 \cdot x22 +$$
$$drp32 \cdot P32x + drp03 \cdot P03x + drp13 \cdot P13x +$$
$$drp23 \cdot P23x + drp33 \cdot P33x - qix) \cdot drp21\}$$

$$\frac{df}{dy21} = \sum_{i=1}^{m} \{(drp00 \cdot P00y + drp10 \cdot P10y + \qquad (96)$$
$$drp20 \cdot P20y + drp30 \cdot P30y + drp01 \cdot P01y +$$
$$drp11 \cdot y11 + drp21 \cdot y21 + drp31 \cdot P31y +$$
$$drp02 \cdot P02y + drp12 \cdot y12 + drp22 \cdot y22 +$$
$$drp32 \cdot P32y + drp03 \cdot P03y + drp13 \cdot P13y +$$
$$drp23 \cdot P23y + drp33 \cdot P33y - qiy) \cdot drp21\}$$

$$\frac{df}{dz21} = \sum_{i=1}^{m} \{(drp00 \cdot P00z + drp10 \cdot P10z + drp20 \cdot P20z + \qquad (97)$$
$$drp30 \cdot P30z + drp01 \cdot P01z + drp11 \cdot z11 + drp21 \cdot z21 +$$
$$drp31 \cdot P31z + drp02 \cdot P02z + drp12 \cdot z12 + drp22 \cdot z22 +$$
$$drp32 \cdot P32z + drp03 \cdot P03z + drp13 \cdot P13z +$$
$$drp23 \cdot P23z + drp33 \cdot P33z - qiz) \cdot drp21\}$$

-continued $$\frac{df}{dx22} = \sum_{i=1}^{m} \{(drp00 \cdot P00x + drp10 \cdot P10x + \quad (98)$$
$$drp20 \cdot P20x + drp30 \cdot P30x + drp01 \cdot P01x +$$
$$drp11 \cdot x11 + drp21 \cdot x21 + drp31 \cdot P31x +$$
$$drp02 \cdot P02x + drp12 \cdot x12 + drp22 \cdot x22 +$$
$$drp32 \cdot P32x + drp03 \cdot P03x + drp13 \cdot P13x +$$
$$drp23 \cdot P23x + drp33 \cdot P33x - qiy) \cdot drp22\}$$

$$\frac{df}{dy22} = \sum_{i=1}^{m} \{(drp00 \cdot P00y + drp10 \cdot P10y + \quad (99)$$
$$drp20 \cdot P20y + drp30 \cdot P30y + drp01 \cdot P01y +$$
$$drp11 \cdot y11 + drp21 \cdot y21 + drp31 \cdot P31y +$$
$$drp02 \cdot P02y + drp12 \cdot y12 + drp22 \cdot y22 +$$
$$drp32 \cdot P32y + drp03 \cdot P03y + drp13 \cdot P13y +$$
$$drp23 \cdot P23y + drp33 \cdot P33y - qiy) \cdot drp22\}$$

$$\frac{df}{dz22} = \sum_{i=1}^{m} \{(drp00 \cdot P00z + drp10 \cdot P10z + drp20 \cdot P20z + \quad (100)$$
$$drp30 \cdot P30z + drp01 \cdot P01z + drp11 \cdot z11 + drp21 \cdot z21 +$$
$$drp31 \cdot P31z + drp02 \cdot P02z + drp12 \cdot z12 + drp22 \cdot z22 +$$
$$drp32 \cdot P32z + drp03 \cdot P03z + drp13 \cdot P13z +$$
$$drp23 \cdot P23z + drp33 \cdot P33z - qiy) \cdot drp22\}$$

may be obtained.

Here, supposing the following formula:

$$\sum_{i=1}^{m} \{(drp00 \cdot P00x + drp10 \cdot P10x + drp20 \cdot P20x + \quad (101)$$
$$drp30 \cdot P30x + drp01 \cdot P01x + drp11 \cdot x11 +$$
$$drp21 \cdot x21 + drp31 \cdot P31x + drp02 \cdot P02x +$$
$$drp12 \cdot x12 + drp22 \cdot x22 + drp32 \cdot P32x +$$
$$drp03 \cdot P03x + drp13 \cdot P13x + drp23 \cdot P23x +$$
$$drp33 \cdot P33x - qix) \cdot drp11\} = \sum Kix$$

formulas (67), (80), (95), (98) may be represented by the form of a matrix as shown in the following formula:

$$\begin{bmatrix} \sum(drp11 \cdot drp11) & \sum(drp21 \cdot drp11) & \sum(drp12 \cdot drp11) \\ \sum(drp11 \cdot drp21) & \sum(drp21 \cdot drp21) & \sum(drp12 \cdot drp21) \\ \sum(drp11 \cdot drp12) & \sum(drp21 \cdot drp12) & \sum(drp12 \cdot drp12) \\ \sum(drp11 \cdot drp22) & \sum(drp21 \cdot drp22) & \sum(drp12 \cdot drp22) \end{bmatrix} \quad (102)$$

$$\begin{bmatrix} \sum(drp22 \cdot drp11) \\ \sum(drp22 \cdot drp21) \\ \sum(drp22 \cdot drp12) \\ \sum(drp22 \cdot drp22) \end{bmatrix} \begin{bmatrix} x11 \\ x21 \\ x12 \\ x22 \end{bmatrix} = \begin{bmatrix} -\sum Kix \cdot drp11 \\ -\sum Kix \cdot drp21 \\ -\sum Kix \cdot drp12 \\ -\sum Kix \cdot drp22 \end{bmatrix}$$

Similarly, supposing the following formulas:

$$\sum_{i=1}^{m} \{(drp00 \cdot P00y + drp10 \cdot P10y + drp20 \cdot P20y + \quad (103)$$
$$drp30 \cdot P30y + drp01 \cdot P01y + drp11 \cdot y11 +$$
$$drp21 \cdot y21 + drp31 \cdot P31y + drp02 \cdot P02y +$$
$$drp12 \cdot y12 + drp22 \cdot y22 + drp32 \cdot P32y +$$
$$drp03 \cdot P03y + drp13 \cdot P13y + drp23 \cdot P23y +$$
$$drp33 \cdot P33y - qiy) \cdot drp11\} = \sum Kiy$$

$$\sum_{i=1}^{m} \{(drp00 \cdot P00z + drp10 \cdot P10z + drp20 \cdot P20z + drp30 \cdot P30z + \quad (104)$$
$$drp01 \cdot P01z + drp11 \cdot z11 + drp21 \cdot z21 + drp31 \cdot P31z +$$
$$drp02 \cdot P02z + drp12 \cdot z12 + drp22 \cdot z22 +$$
$$drp32 \cdot P32z + drp03 \cdot P03z + drp13 \cdot P13z +$$
$$drp23 \cdot P23z + drp33 \cdot P33z - qiz) \cdot drp11\} = \sum Kiz$$

formulas (72), (81), (96), (99) and formulas (73), (82), (97), (100) may be represented by the form of matrices as shown in the following formulas:

$$\begin{bmatrix} \sum(drp11 \cdot drp11) & \sum(drp21 \cdot drp11) & \sum(drp12 \cdot drp11) & \sum(drp22 \cdot drp11) \\ \sum(drp11 \cdot drp21) & \sum(drp21 \cdot drp21) & \sum(drp12 \cdot drp21) & \sum(drp22 \cdot drp21) \\ \sum(drp11 \cdot drp12) & \sum(drp21 \cdot drp12) & \sum(drp12 \cdot drp12) & \sum(drp22 \cdot drp12) \\ \sum(drp11 \cdot drp22) & \sum(drp21 \cdot drp22) & \sum(drp12 \cdot drp22) & \sum(drp22 \cdot drp22) \end{bmatrix} \begin{bmatrix} x11 \\ x21 \\ x12 \\ x22 \end{bmatrix} = \begin{bmatrix} -\sum Kiy \cdot drp11 \\ -\sum Kiy \cdot drp21 \\ -\sum Kiy \cdot drp12 \\ -\sum Kiy \cdot drp22 \end{bmatrix} \quad (105)$$

$$\begin{bmatrix} \sum(drp11 \cdot drp11) & \sum(drp21 \cdot drp11) & \sum(drp12 \cdot drp11) & \sum(drp22 \cdot drp11) \\ \sum(drp11 \cdot drp21) & \sum(drp21 \cdot drp21) & \sum(drp12 \cdot drp21) & \sum(drp22 \cdot drp21) \\ \sum(drp11 \cdot drp12) & \sum(drp21 \cdot drp12) & \sum(drp12 \cdot drp12) & \sum(drp22 \cdot drp12) \\ \sum(drp11 \cdot drp22) & \sum(drp21 \cdot drp22) & \sum(drp12 \cdot drp22) & \sum(drp22 \cdot drp22) \end{bmatrix} \begin{bmatrix} x11 \\ x21 \\ x12 \\ x22 \end{bmatrix} = \begin{bmatrix} -\sum Kiz \cdot drp11 \\ -\sum Kiz \cdot drp21 \\ -\sum Kiz \cdot drp12 \\ -\sum Kiz \cdot drp22 \end{bmatrix} \quad (106)$$

Since, thus, each variable is independent, three sets of four-way linear equations may be solved to determine the coordinate data (x12, y12, z12), (x21, y21, z21) and (x22, y22, z22) of the internal control points, vector P11, vector P12, vector P21 and vector P22.

Specifically, upon finding the coordinate data (x11, y11, z11), (x12, y12, z12), (x21, y21, z21) and (x22, y22, z22) by executing the calculation of formulas (102), (105) and (106), the free-form surface forming unit 12 proceeds to step SP18.

Here, the free-form surface forming unit 12 compares the found coordinate data (x11, y11, z11) to (x22, y22, z22) and the coordinate data (x11, y11, z11) to (x22, y22, z22) of the internal control points, vector P11 to vector P22, generated at step SP16, respectively, to judge whether the difference between the respective coordinate data is less than a predetermined set value.

Here, if a negative result is obtained, the free-form surface forming unit 12 returns to step SP16 where it generates a patch vector S(u,v) on the basis of the coordinate data (x11, y11, z11) to (x22, y22, z22) of the found internal control points, vector P11 to vector P22, and proceeds to step SP17.

Figure 16:
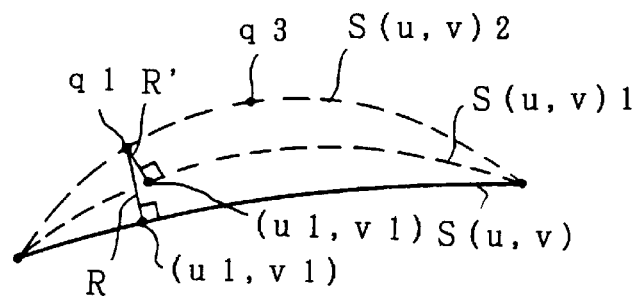
FIG. 16 is a schematic diagram for the explanation of transformation of a patch.

Thus, as shown in FIG. 16, at the free-form surface forming unit 12: perpendiculars are drawn to the patch vector S(u,v); parameters u, v, corresponding to the given point group, vector q1 to vector qm, are set; and internal control points, vector P11 to vector P22, are set so as to minimize the distance di between the points, vector R1 to vector Rm, on the patch vector S(u,v) defined by the parameter u, v, and the respective points, vector q1 to vector qm.

Further, after generating a patch vector S(u,v) by thus set internal control points, vector P11 to vector P22, perpendiculars are drawn to the patch vector S(u,v)1 to determine parameters u, v, and internal control points, vector P11 to vector P22, are determined such that the points, vector R1 to vector Rm, on the patch vector S(u,v)1 defined by the parameter u, v, and the respective points, vector q1 to vector qm.

Thus, it is possible to sequentially deform the patch vector S(u,v) by repeating the processing procedure of steps SP16–SP17–SP18–SP16to generate a free-form surface of the geometry represented by the input point group, vector q1 to vector qm.

That is, if an affirmative result is obtained at step SP18, the free-form surface forming unit 12 proceeds to step SP19 where it generates over again a patch vector S(u,v) on the basis of the coordinate data (x11, y11, z11) to (x22, y22, z22) of thus found internal control points, vector P11 to vector P22, and proceeds to step SP20 where the processing procedure is terminated.

Thus, it is possible to generate a free-form surface by inputting a group of points and the operability of the free-form surface forming unit 12 may be improved.

Figure 17:
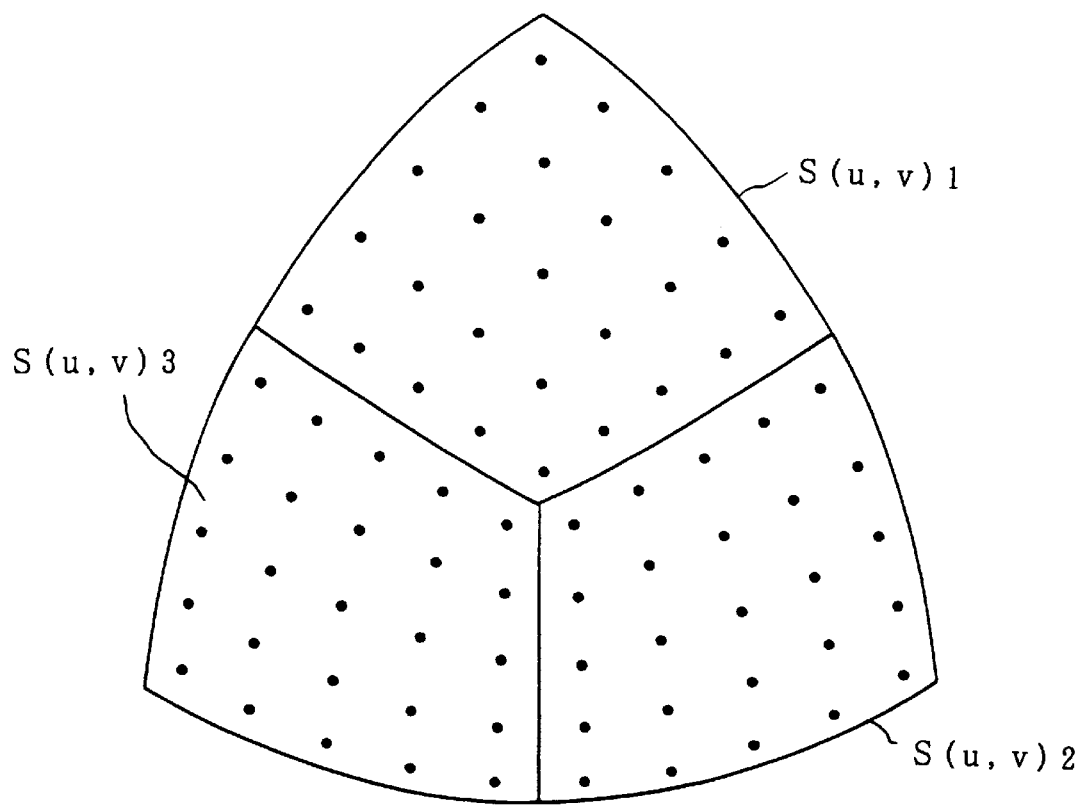
FIG. 17 is a schematic diagram showing the input of actual point groups.
Figure 18:
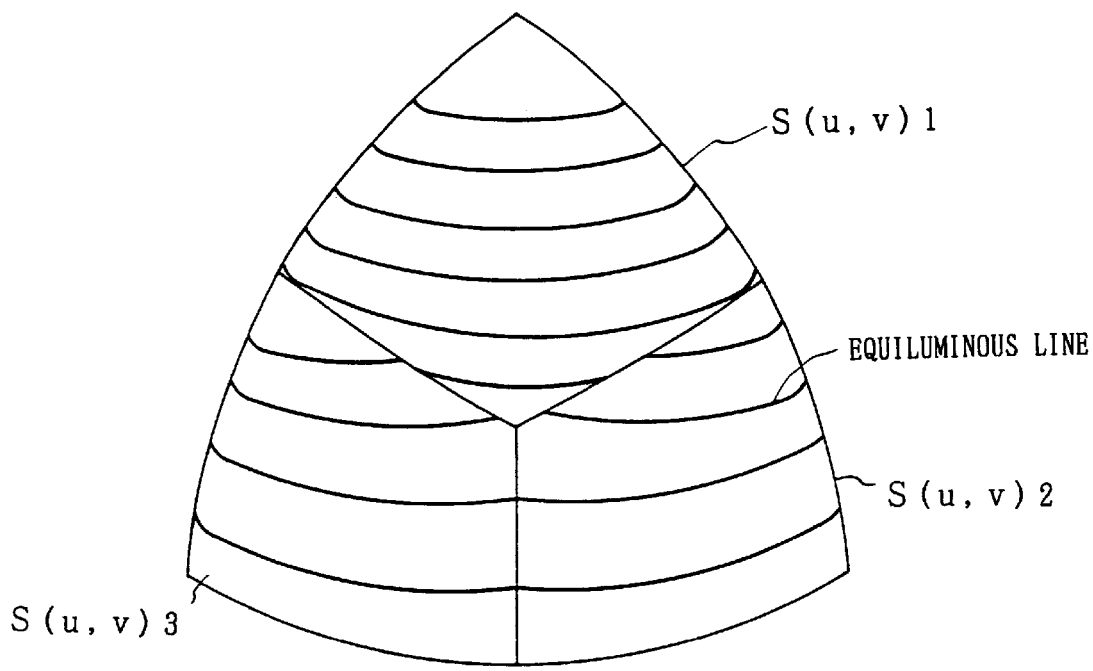
FIG. 18 is a schematic diagram showing a patch immediately after setting.
Figure 19:
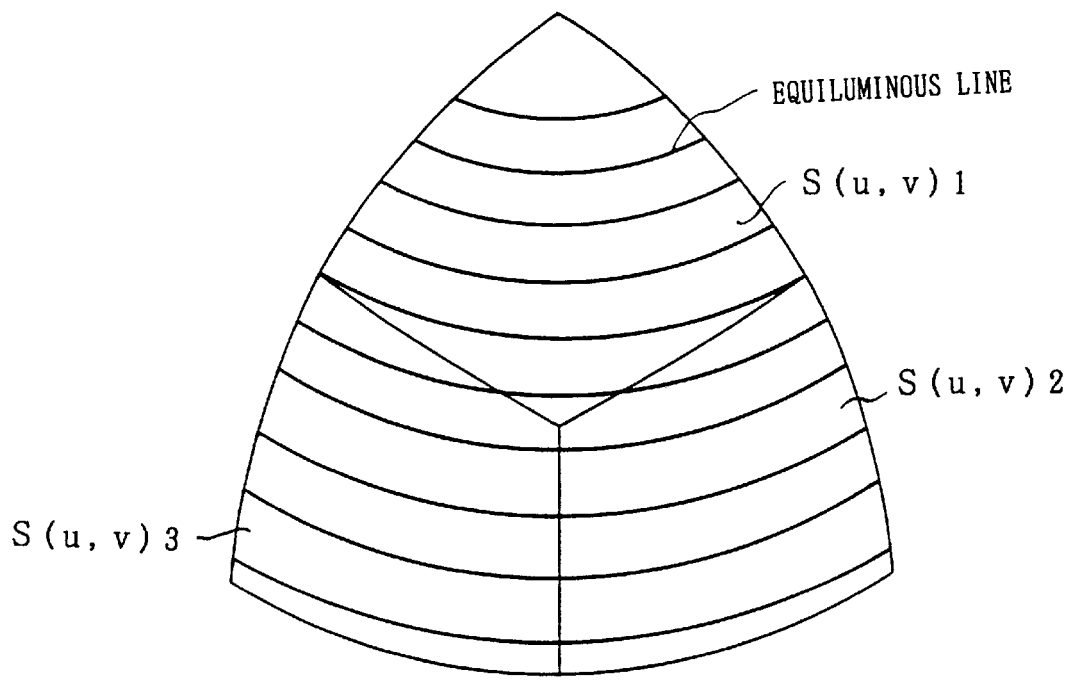
FIG. 19 is a schematic diagram showing a patch exhibiting the final shape.

In practice, when as shown in FIG. 17 the coordinate data of a spherical surface of a ⅛ sphere were input to generate three patches, vector S(u,v)1, vector S(u,v)2 and vector S(u,v)3, the patches, vector S(u,v)1, vector S(u,v)2 and vector S(u,v)3, having large errors at the beginning with respect to the originally input points, were able to be gradually transformed to a geometry close to the point group, and, at last, they were able to be transformed to a geometry that is substantially a spherical surface as shown in FIGS. 18 and 19.

In this manner, a patch is temporarily generated and internal control points of the patches are set such that the sum of squares of the lengths of the perpendiculars drawn from the input point group to the patch is minimized to generate a patch having a geometry similar to the group of points. Thereby, a desired free-form surface may be generated by inputting a group of points and the operability of the free-form surface forming unit may be improved.

Generation of the Free-Form Surface

In patches formed into framing spaces in this manner, one of the framing spaces is in some cases, for example, too large.

Figure 20:
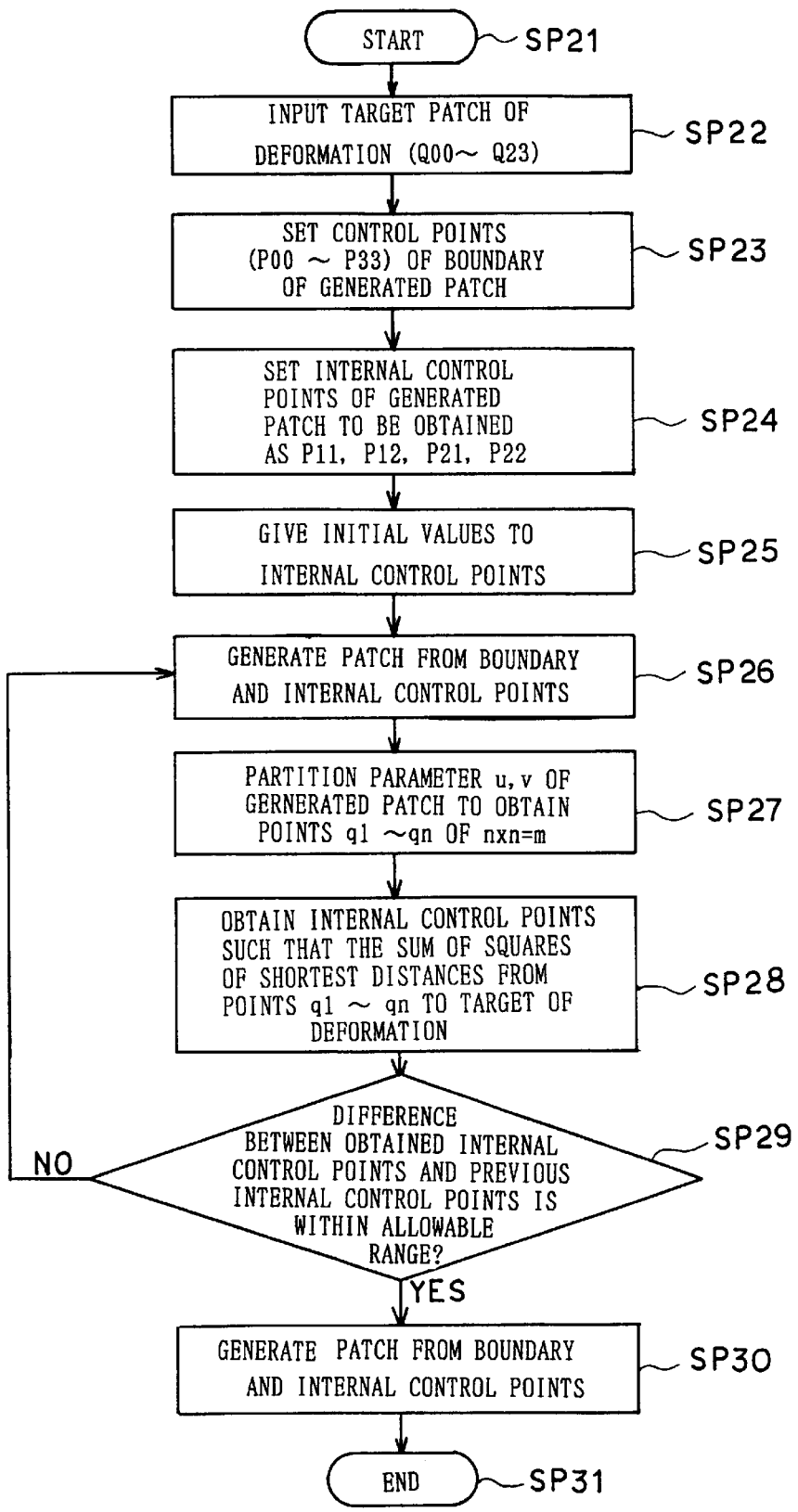
FIG. 20 is a flowchart showing the processing procedure of partition, transformation processing of a patch.

In such a case, the free-form surface forming unit 12 generates a patch in the framing space which is set anew by the operator by executing the processing procedure shown in FIG. 20 in response to the operation by the operator and, then, deform the patch into the original curved surface.

That is, the free-form surface forming unit 12 proceeds from step SP21 to step SP22 where, in response to the operation by the operator, it takes in the data, with respect to the framing space to be set over again by the user, of a patch vector S(u,v)M which is pasted on the framing space.

Figure 21:
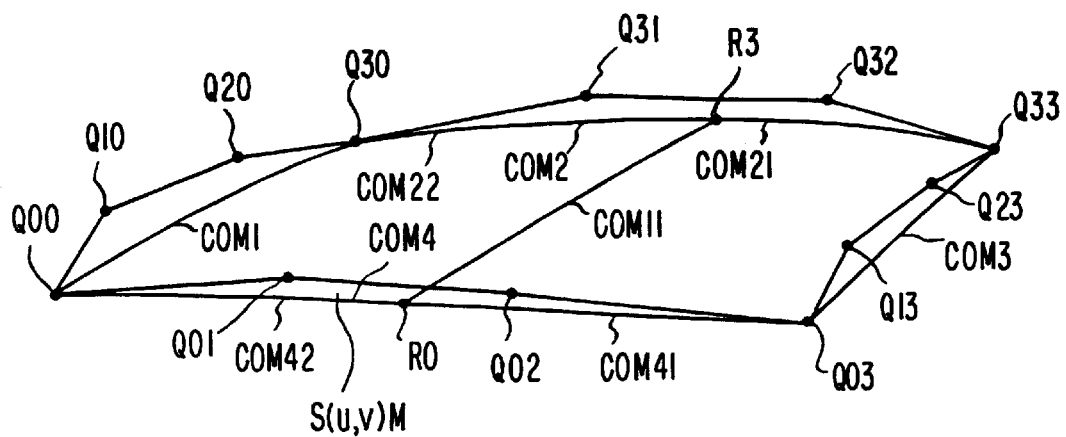
FIG. 21 is a schematic diagram showing a patch to be partitioned.

Specifically, as shown in FIG. 21, the free-form surface forming unit 12 takes in the coordinate data of the nodal points, vector Q00, vector Q30, vector Q03 and vector Q33, and the control points, vector Q01, vector Q02, vector Q10, vector Q20, vector Q31, vector Q32, vector Q13 and vector Q23, and, then, proceeds to step SP23 where it generates curve data of the new framing space set by the operator.

In this generation processing, when the operator designates points, vector R3 and vector R0, on the boundary curves COM2 and COM4 by using such as a digitizer, the points, vector R3 and vector R0, are respectively set as nodal points. In addition, parameters and internal control points are set over again by dividing the boundary curves COM2 and COM4 at the points, vector R0 and vector R3, whereby the boundary curves COM2 and COM4 are respectively divided into two boundary curves, COM21, COM41 and COM22, COM42.

Further, the free-form surface forming unit 12 generates a free-form curve connecting the points, vector R0, vector R3, and set the free-form curve as a boundary curve COM11.

Thereby, at the free-form surface forming unit 12, the framing space surrounded by the boundary curves COM1 to COM4 is divided into two framing space which are respectively surrounded by the boundary curves COM1, COM22, COM11 and COM42, and by the boundary curves COM11, COM21, COM3 and COM41.

Further, at the free-form surface forming unit 12, when generating the boundary curves COM21, COM41, COM22 and COM42, a series of points are generated on the boundary curves COM2 and COM4 and, then, the boundary curves COM21, COM41, COM22 and COM42 are generated by executing the processing procedure described with reference to FIG. 10 with respect to the point series. Thereby, the boundary curves COM21, COM41, COM22 and COM42 are generated in the geometrical shape of the original boundary curves COM2 and COM4.

Similarly, when generating the boundary curve COM11, the free-form surface forming unit 12 forms a series of points on the patch vector S(u,v)M connecting the points, vector R0 and vector R3, and, then, generates the boundary curve COM11 by executing the processing procedure described with reference to FIG. 10 with respect to the point series. Thereby, the boundary curve COM11 is generated in the curved surface geometry of the original patch vector S(u,v).

Figure 22:
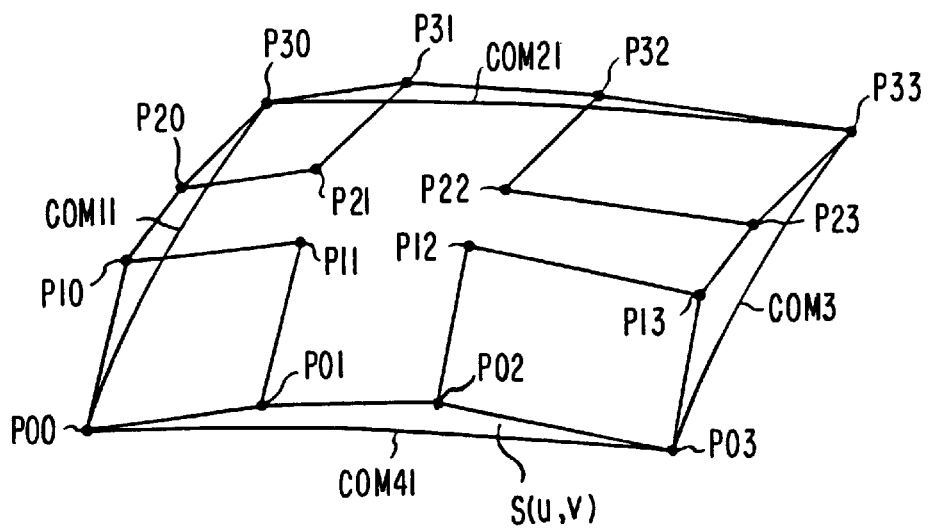
FIG. 22 is a schematic diagram of a patch to be transformed.

Subsequently, the free-form surface forming unit 12 proceeds to step SP24 where, as shown in FIG. 22, internal control points, vector P11, vector P12, vector P21 and vector P22, are set with respect to the framing space surrounded by the boundary curves COM3, COM2, COM11 and COM41.

Thereby, the free-form surface forming unit 12 repeatedly redetermine the internal control points vector P11, vector P12, vector P21 and vector P22, so as to generate a new patch S(u,v) such that its geometric shape is sequentially made closer to the surface geometry of the original patch vector S(u,v).

That is, the free-form surface forming unit 12 proceeds to step SP25 where the calculation processing of formulas (41) through (44) is executed to set the coordinate data (x11, y11, z11), (x12, y12, z12), (x21, y21, z21) and (x22, y22, z22) of the internal control points, vector P11, vector P12, vector P21 and vector P22 of the internal control points vector P11, vector P12 and vector P21, to their initial value.

Subsequently, the free-form surface forming unit 12 proceeds to step SP26 where a patch vector S(u,v) defined by the internal control points, vector P11 to vector P22, and boundary curves COM11, COM21, COM3 and COM41 is generated and, then, it proceeds to step SP27.

Figure 23:
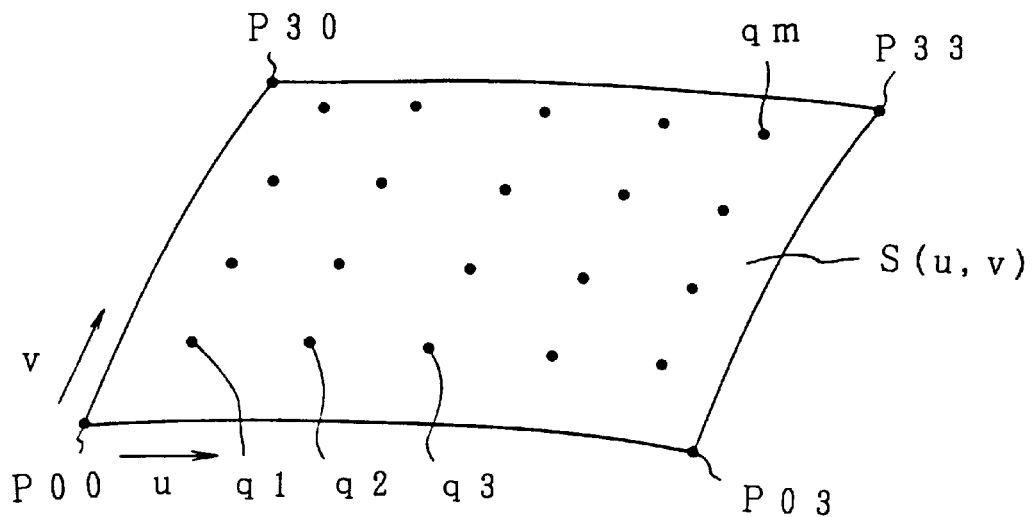
FIG. 23 is a schematic diagram for the explanation of a group of points set on the patch.

Here, as shown in FIG. 23, the free-form surface forming unit 12 divides the parameters of the patch vector S(u,v) into "n" (in this case, n consisting of 10) and determines 9×9 points, vector q1 to vector qm (m=81) on the patch vector S(u,v).

Figure 24:
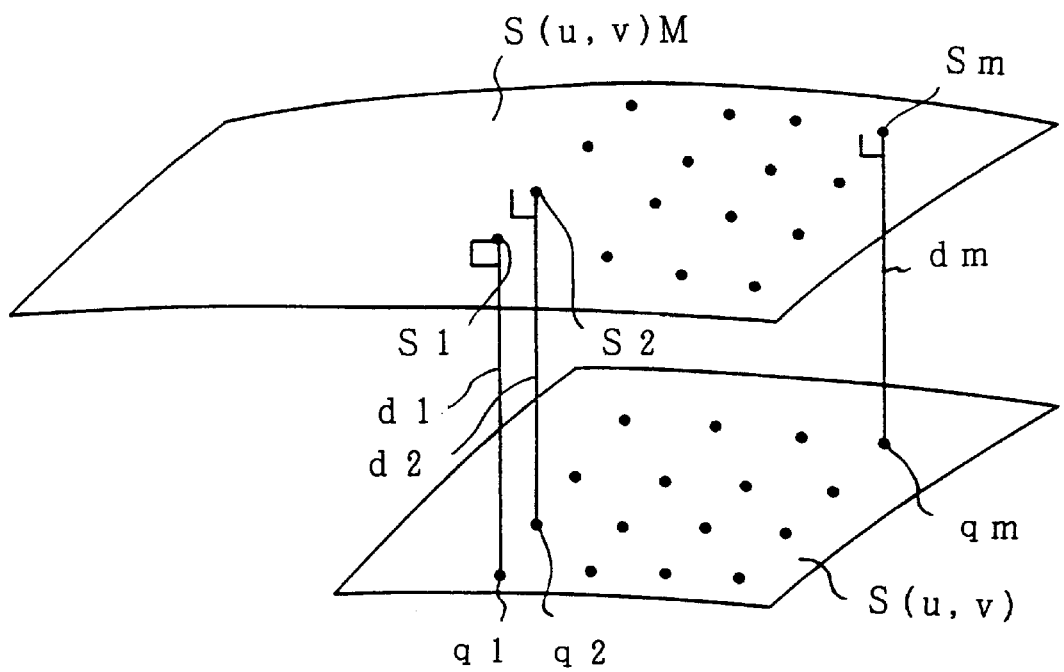
FIG. 24 is a schematic diagram for the explanation of detection processing of distances from the group of points to the patch.

Subsequently, the free-form surface forming unit 12 proceeds to step SP28 where, as shown in FIG. 24, perpendiculars are drawn onto the patch vector S(u,v)M which comprises the target of transformation respectively from the points, vector q1 to vector qm, set on the patch vector S(u,v), so as to find the intersections, vector S1 to vector Sm of the respective perpendiculars with the patch vector S(u,v)M.

Further, the free-form surface forming unit 12 determines the distances di from the respective points, vector q1 to vector qm to the corresponding intersections, vector S1 to vector Sm, and, thereby, it finds the minimum distance from the respective points, vector q1 to vector qm, set on the patch S(u,v) to the patch vector S(u,v)M.

At this time, in the case where as intersection cannot be formed on the patch vector S(u,v)M when perpendiculars are drawn to the patch vector S(u,v)M respectively from the points, vector q1 to vector qm, (since, in this case, it comprises a framing space generated by dividing a patch, all of vector q1 to vector qm form intersections on the patch vector S(u,v)M), the point with the shortest distance to the patch vector S(u,v)M is set as the intersection vector qm and, thereby, the distances di are determined with respect to the points, vector R1 to vector Rm.

Further, upon finding the distances di, the free-form surface forming unit 12 determines the sum of squares of the distances di and, then, sets over again the internal control points, vector P11, vector P12, vector P21 and vector P22, such that the sum of the squares is minimized.

In this case, the free-form surface forming unit 12 is able to find the sum of squares of the distances di such that: the coordinate values S(u,v)x, S(u,v)y and S(u,v)z representing the point vector qi set on the patch vector S(u,v) are substituted in formula (45) for the coordinate values S(u,v)x, S(u,v)y and S(u,v)z representing the coordinates of the intersection vector Ri; and the coordinate value S(u,v)Mx, S(u,v)My and S(u,v)Mz of vector S1 to vector Sm of the intersections are substituted for the coordinate values qix, qiy and qiz representing the respective input point vectors qi.

Therefore, at the free-form surface forming unit 12, the internal control points, vector P11, vector P12, vector P21 and vector P22, for which minimizes the sum of squares may be found by executing an operation processing in a similar manner as described above with reference to formula (47) through (106).

Thus, upon finding the internal control points, vector P11, vector P12, vector P21 and vector P22, the execution at the free-form surface forming unit 12 proceeds to step SP29 where the coordinate data (x11, y11, z11) to (x22, y22, z22) of thus found internal control points, vector P11 to vector P22, and the coordinate data (x11, y11, z11) to (x22, y22, z22) of the internal control points, vector P11 to vector P22, generated at step SP26 are respectively compared to judge whether the difference in the respective coordinate data is less than a predetermined value.

Here, if a negative result is obtained, the free-form surface unit 12 returns to step SP26 where it generates a patch vector S(u,v) on the basis of the coordinate data (x11, y11, z11) to (x22, y22, z22) of the found internal control points, vector P11 to vector P22, and proceeds to step SP27.

Thus, at the free-form surface unit 12, the processing procedure of steps SP26–SP27–SP28–SP29–SP26 is repeatedly executed to sequentially deform the patch vector S(u,v) so that it is made closer to the surface geometry of the original patch vector S(u,v)M. Since an affirmative result will be obtained at step SP29 as such change becomes smaller, it proceeds to step SP30 where the patch vector S(u,v) of the final geometry is generated and, then, it proceeds to step SP31 where the processing procedure is terminated.

Subsequently, at the free-form surface unit 12, a patch approximated to the original patch is generated in a similar manner also for the remaining framing space, and, thereby, the original surface geometry may be obtained even when a patch is divided.

Figure 25:
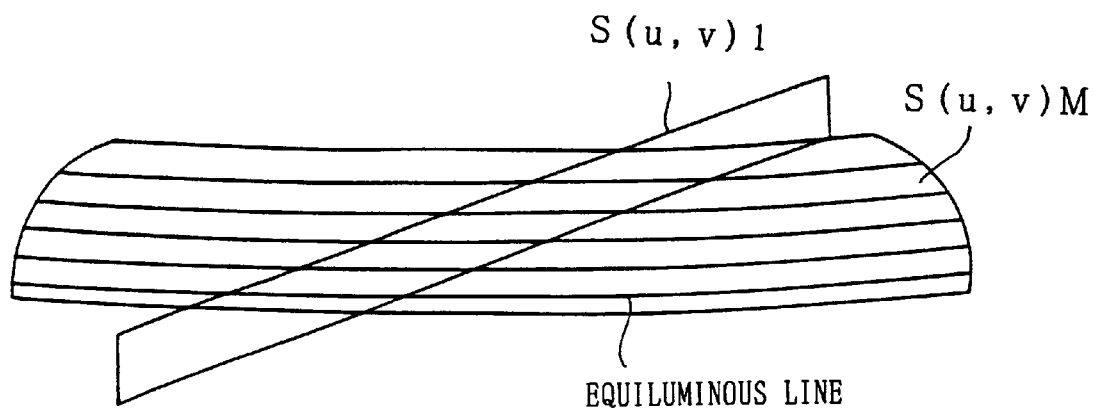
FIG. 25 is a schematic view showing a patch which is the object of an actual partition, transformation processing.
Figure 26:
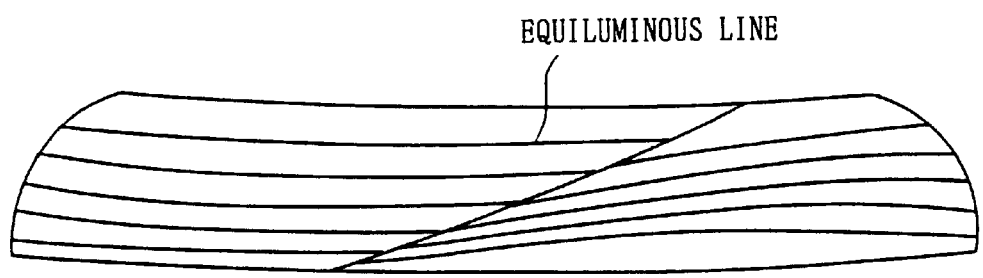
FIG. 26 is a schematic diagram showing the patch immediately after the partition thereof.

In an experiment where, as shown in FIG. 25, a patch vector S(u,v)M having a circular-arc cross section geometry is actually partitioned by a plane S(u,v), it is seen that, as shown in FIG. 26, the surface changes unnaturally at the partitioned portion and the equiluminous curve is also different from the original state if the internal control points, vector P11 to vector P22, are merely set.

Figure 1:
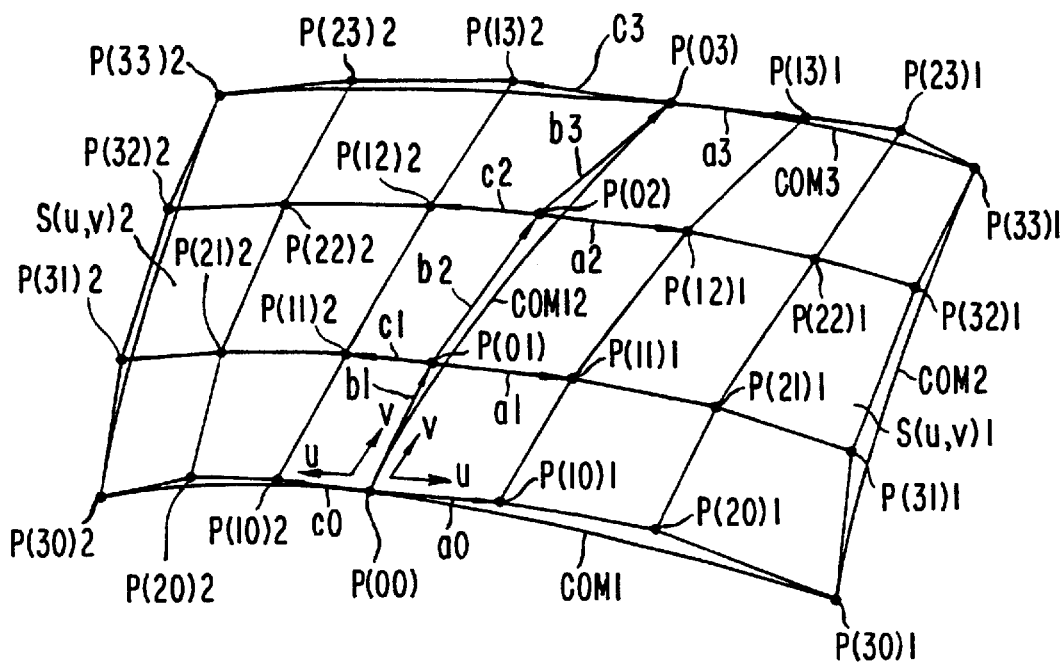
FIG. 1 is a schematic diagram for the explanation of a free-form curve surface.
Figure 27:
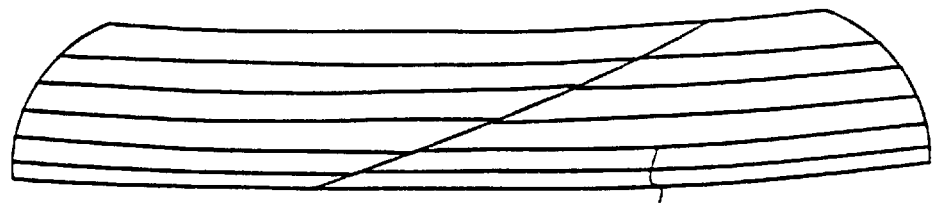
FIG. 27 is a schematic diagram showing the patch exhibiting the final shape thereof.

On the other hand, it was confirmed that, if the patch after the partition is transformed as shown in FIG. 27 by executing the above described processing procedure, the surface geometry of the original patch vector S(u,v)M may be regenerated in a substantially complete form.

Thus, a patch is temporarily generated and internal control points of the patch are set so that the sum of squares of the lengths of perpendiculars drawn from a group of points set on the patch to a patch of the target of transformation is minimized to make closer the surface geometry of the patch to the target patch of transformation. Thereby, it is possible to set over again the framing space as required and the operability of the free-from surface forming unit may be improved.

Advantage of the Embodiments

According to the above construction, a free-form curve assimilated to a point series may be formed in a simple manner such that: the start point and the end point of the input point series are set as the nodal points; perpendiculars are drawn from each of the input points to detect the parameter of the intersections with the a free-form curve; and the control points are set over again so that the distances from the respective points of the point series to the free-form curve determined by the parameter is minimized. Thus, a free-form curve may be generated by inputting the point series.

Further, a patch is temporarily generated and internal control points of the patches are set such that the sum of squares of the lengths of the perpendiculars drawn from the input point group to the patch is minimized to generate a patch having a geometry similar to the group of points. Thereby, a desired free-form surface may be generated by inputting a group of points.

Further, on the contrary, a group of points are set on a temporarily generated patch and the internal control points of the patch are set so that the sum of squares of the lengths of perpendiculars drawn from the point group to a target patch of transformation is minimized to make closer the surface geometry of the patch to the target patch of transformation.

Thus, free-form curves and free-form surfaces may be generated by inputting a group of points and the generated free-form surface may be freely transformed as required. Accordingly, the operability of the free-form surface forming unit may be improved.

Other Embodiments

While, in the above described embodiments, a case has been described where a series of points are inputted to generated a free-form curve and thereby a wire-frame model is generated, the present invention is not limited to this and it may be widely used to cases where a free-form curve is formed as required.

Further, in the above described embodiments, a case has been described where a patch is generated by using a group of points that have been inputted by the user, the present invention is not limited to this and it may be widely applied to such cases as where an offset surface for processing a curved surface formed by a designing device is formed or where a fillet surface is formed.

That is, when an offset surface is to be formed, a group of points are sequentially formed at positions separated by tool radius from the original surface. Thereby, if a patch is generated by using the group of points, it is possible to form an offset surface with high accuracy of approximation.

On the other hand, when a fillet surface is to be formed, calculating processing is executed on the basis of the original surface data to form a group of points which represent the fillet surface. Thus, by generating a patch using the group of points, the fillet surface may readily be formed.

Also, if a group of points are formed on the basis of such result of calculation processing and a patch is generated using the group of points, a geometric shape such as a sphere or cylinder may readily be formed.

Further, it is possible to generate the contour of an object to be measured on the basis of an output data such as a three-dimensional measuring device.

Moreover, while the above described embodiments have been described with respect to a case where a patch is divided to obtain the original surface geometry by setting a group of points on the patch, the present invention is not limited to this and it may be widely applied to such as a case where a plurality of patches are replaced by a single patch or a case of representing the state where a seal, for example, is pasted on a desired surface.

As has been described, according to the present invention, a method for forming a free-form curve may be obtained in which a free-form curve assimilated to a series of points may readily be formed such that: the start point and the end point of the point series are set as the nodal points to temporarily set a free-form curve; perpendiculars are then from the respective points to find the parameter of the intersections with the free-form curve; and the control points are set over again so that the distances from the respective points of the point series to the free-form curve determined by the parameter is made smaller.

Further, a method of forming a free-form surface capable of generating a patch having a desired surface geometry such that: the minimum distance from each point to a reference patch is found on the basis of the coordinate data of a plurality of points; and internal control points are set so that the total sum of such minimum distances may be minimized.

If, at this time, internal control points are set in the framing space of a patch and a patch of which the contour is represented by a plurality of points is generated, it is possible to obtain a method for forming a free-form surface in which a group of points may be inputted to readily generate a patch with its contour formed of the group of points.

Further, a plurality of points are set on a patch to be transformed and internal control points are set in the framing space of the patch to be transformed on the basis of the minimum distance to the target patch of transformation. Thereby, a method for forming a free-form surface may be obtained, in which a patch of an original surface geometry may be generated, for example, even when the framing space is processed to modified.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A method of forming an object on the basis of data representing a free-form surface, the method comprising the steps of:

generating control points between two nodal points on a three-dimensional space;

generating a free-form curve represented by a vector function using a predetermined parameter on the basis of said nodal points and control points;

setting a start point and an end point of an input series of points as said nodal points and temporarily setting said control points on the basis of points adjoining said start point and said end point of said input series of points;

finding said parameter of a plurality of intersections with said free-form curve by drawing perpendiculars from each point of said input series of points to said free-form curve determined by said nodal points and said control points;

resetting said control points such that the total sum of distances from the respective points of said input series of points to said free-form curve determined by the parameter is minimized;

forming said free-form curve assimilated to said input series of points by means of said set nodal points and the reset control points;

generating a free-form surface on the basis of said assimilated free-form curve;

transmitting data representing said free-form surface to a tool path forming unit;

generating at said tool path forming unit processing data on the basis of said data representing said free-form surface; and molding an object on the basis of said processing data, said object being a physical embodiment of said free-form surface.

2. A method of forming an object on the basis of data representing a free-form surface, the method comprising the steps of:

setting internal control points in a framing space surrounded by boundary curves on a three-dimensional space; superimposing a reference patch represented by a predetermined vector function on said framing space on the basis of said boundary curves and said internal control points;

finding, on the basis of coordinate data of a plurality of input points, the shortest distance from each of said plurality of input points to said reference patch;

generating a second patch on the basis of said internal control points such that the total sum of said shortest distances is minimized;

generating a free-form surface on the basis of said second patch;

transmitting data representing said free-form surface to a tool path forming unit;

generating at said tool path forming unit processing data on the basis of said data representing said free-form surface; and molding an object on the basis of said processing data, said object being a physical embodiment of said free-form surface.

3. A method of forming an object on the basis of data representing a free-form surface, the method comprising the steps of:

setting internal control points in a framing space surrounded by boundary curves on a three-dimensional space;

superimposing a reference patch represented by a predetermined vector function on said framing space on the basis of said boundary curves and said internal control points;

finding the shortest distances from a plurality of input points to said reference patch formed on said framing space;

setting internal control points in the framing space of said reference patch such that the total sum of said shortest distances is minimized;

generating a second patch of which a contour is represented by said plurality of input points;

generating a free-form surface on the basis of said second patch;

transmitting data representing said free-form surface to a tool-path forming unit;

generating at said tool path forming unit processing data on the basis of said data representing said free-form surface; and molding an object on the basis of said processing data, said object being a physical embodiment of said free-form surface.

4. A method for forming an object on the basis of data representing a free-form surface, the method comprising the steps of:

setting internal control points in a framing space surrounded by boundary curves on a three-dimensional space;

superimposing a patch to be transformed represented by a predetermined vector function on said framing space on the basis of said boundary curves and said internal control points;

setting a plurality of input points on said patch to be transformed;

finding the shortest distances from said plurality of input points to a second patch, said second patch being a target of transformation;

setting internal control points in the framing space of said first patch to be transformed such that the total sum of said shortest distances is minimized;

transforming said first patch such that said first patch has a surface geometry of said transformation target in the framing space of said patch to be transformed;

generating a free-form surface on the basis of said transformed first patch;

transmitting data representing said free-form surface to a tool path forming unit;

generating at said tool path forming unit processing data on the basis of said data representing said free-form surface; and molding an object on the basis of said processing data, said object being a physical embodiment of said free-form surface.

5. An apparatus for forming an object on the basis of data representing a free-form surface, said apparatus comprising:

means for generating control points between two nodal points on a three-dimensional space;

means for generating a free-form curve represented by a vector function using a predetermined parameter on the basis of said nodal points and control points;

means for setting a start point and an end point of an input series of points as said nodal points;

means for temporarily setting said control points on the basis of the points adjoining said start point and said end point of said input series of points;

means for finding said parameter of a plurality of intersections with said free-form curve by drawing perpendiculars from each point of said input series of points to said free-form curve determined by said nodal points and said control points;

means for resetting said control points such that the total sum of distances from said respective points of said input series of points to said free-form curve determined by the parameter is minimized;

means for forming said free-form curve assimilated to said input series of points by means of said set nodal points and the reset control points;

means for generating a free-form surface on the basis of said assimilated free-form curve;

means for transmitting data representing said free-form surface to a tool path forming unit;

means for generating at said tool path forming unit processing data on the basis of said data representing said free-form surface; and means for molding an object on the basis of said processing data, said object being a physical embodiment of said free-form surface.

* * * * *